US012792013B2

(12) United States Patent
Seguias-Bandry et al.

(10) Patent No.: US 12,792,013 B2
(45) Date of Patent: Nov. 10, 2026

(54) METHODS, SYSTEMS, APPARATUSES, AND COMPUTER PROGRAM PRODUCTS FOR FOLLOWING AN EDGE OF AN OBJECT

(71) Applicant: Assurant, Inc., New York, NY (US)

(72) Inventors: Najib Seguias-Bandry, Murfreesboro, TN (US); Harrison Hanks, Nashville, TN (US); Richa Phulwani, Nashville, TN (US)

(73) Assignee: Assurant, Inc., New York, NY (US)

( * ) Notice: Subject to any disclaimer, the term of this patent is extended or adjusted under 35 U.S.C. 154(b) by 17 days.

(21) Appl. No.: 18/794,667

(22) Filed: Aug. 5, 2024

(65) Prior Publication Data

US 2025/0216835 A1 Jul. 3, 2025

Related U.S. Application Data

(60) Provisional application No. 63/614,938, filed on Dec. 27, 2023.

(51) Int. Cl.
*G05B 19/4155* (2006.01)

(52) U.S. Cl.
CPC .................... *G05B 19/4155* (2013.01); *G05B 2219/40269* (2013.01)

(58) Field of Classification Search
CPC ....... G05B 19/4155; G05B 2219/40269; B25J 9/00; B25J 9/16; B25J 9/02; B25J 9/1612;

(Continued)

(56) References Cited

U.S. PATENT DOCUMENTS 5,650,844 A 7/1997 Aoki et al.
5,717,780 A 2/1998 Mitsumune et al.

(Continued)

FOREIGN PATENT DOCUMENTS

CA 3016367 A1 9/2017
CN 107341490 A 11/2017

(Continued)

OTHER PUBLICATIONS

English Translation of JP Office Action dated Jan. 6, 2026 for JP Application No. 2025064092, 2 page(s).

(Continued)

*Primary Examiner* — Adam R Mott
*Assistant Examiner* — Byron Xavier Kasper
(74) *Attorney, Agent, or Firm* — Alston & Bird LLP

(57) ABSTRACT

Embodiments of the present disclosure provide methods, apparatuses, and computer program products configured to follow an edge of an object via an edge-following system. The edge-following system is configured to execute an edge-following operation configured for determining dimensional attributes associated with the object. Embodiments also include causing a handling tool associated with a multi-axis robot to engage the object. Embodiments also include defining a working point on the edge of the object, where the working point is kept at a predetermined working offset from an ancillary tool. Embodiments also include manipulating the object such that the working point is configured to move along the edge of the object from a first location on a first side of the edge of the object to a second location along a second side of the edge of the object while maintaining the predetermined working offset between the ancillary tool and the working point.

20 Claims, 11 Drawing Sheets

(58) Field of Classification Search
CPC ...... B25J 9/1661; B25J 9/1669; B25J 9/1674; B25J 9/1684; B25J 9/1697; B25J 11/005; B25J 11/008; B25J 13/08; G06Q 30/0278; G06T 7/0002; G06T 7/0004; G06T 7/13; G01N 21/8806; G01N 21/8851
See application file for complete search history.

(56) References Cited

U.S. PATENT DOCUMENTS 5,835,220 A 11/1998 Kazama et al.
5,914,495 A 6/1999 Ishizuka et al.
6,201,601 B1 3/2001 Vaez-Iravani et al.
6,259,827 B1 7/2001 Nichani
6,386,038 B1 5/2002 Lewis et al.
6,597,805 B1 7/2003 Nagao
6,781,688 B2 8/2004 Kren et al.
7,206,066 B2 4/2007 Vurens et al.
7,848,833 B2 12/2010 Li et al.
8,200,533 B2 6/2012 Librizzi et al.
8,248,237 B2 8/2012 Fitzgerald et al.
8,463,646 B2 6/2013 Bowles et al.
8,719,909 B2 5/2014 Fitzgerald et al.
8,822,922 B1 9/2014 Scanlon et al.
8,867,817 B1 10/2014 Cooper et al.
8,932,368 B2 1/2015 Fitzgerald et al.
8,964,062 B1 2/2015 Neglur
8,988,523 B1 3/2015 Kim et al.
9,007,581 B2 4/2015 Horai et al.
9,134,892 B2 9/2015 Hicks
9,253,205 B2 2/2016 Fitzgerald et al.
9,369,865 B2 6/2016 Hsu et al.
9,576,157 B2 2/2017 Fitzgerald et al.
9,703,325 B2 7/2017 Pope et al.
9,838,877 B2 12/2017 Fitzgerald et al.
9,881,152 B2 1/2018 Fitzgerald et al.
9,885,672 B2 2/2018 Forutanpour et al.
9,911,102 B2 3/2018 Bowles et al.
9,916,481 B2 3/2018 Fitzgerald et al.
10,001,878 B2 6/2018 Wood et al.
10,007,934 B2 6/2018 Nguyen
10,032,140 B2 7/2018 Bowles et al.
10,055,798 B2 8/2018 Bowles et al.
10,127,647 B2 11/2018 Forutanpour et al.
10,269,110 B2 4/2019 Forutanpour et al.
10,332,249 B2 6/2019 Dwivedi et al.
10,339,509 B2 7/2019 Bordeleau et al.
10,401,411 B2 9/2019 Snook et al.
10,402,790 B1 9/2019 Clark et al.
10,438,174 B2 10/2019 Bowles et al.
10,475,002 B2 11/2019 Silva et al.
10,572,946 B2 2/2020 Bowles et al.
10,681,552 B2 6/2020 Fitzgerald et al.
10,719,261 B2 7/2020 Törmäet al.
10,810,732 B2 10/2020 Dwivedi et al.
10,821,611 B1 * 11/2020 DeFant ................ B25J 15/0625
10,825,082 B2 11/2020 Librizzi et al.
10,846,881 B2 11/2020 Hashimoto et al.
10,860,990 B2 12/2020 Bowles et al.
10,876,914 B2 12/2020 Fitzgerald et al.
10,909,673 B2 2/2021 Forutanpour et al.
10,977,700 B2 4/2021 Bordeleau et al.
11,080,662 B2 8/2021 Bowles et al.
11,080,672 B2 8/2021 Bowles
11,107,046 B2 8/2021 Bowles
11,126,973 B2 9/2021 Silva et al.
11,210,777 B2 12/2021 Fitzgerald et al.
11,232,412 B2 1/2022 Hunt et al.
11,341,471 B2 5/2022 Dion et al.
11,436,570 B2 9/2022 Bowles et al.
11,443,289 B2 9/2022 Bowles et al.
11,482,067 B2 10/2022 Forutanpour et al.
11,526,932 B2 12/2022 Bowles et al.
11,687,900 B2 6/2023 Dion et al.
11,688,222 B2 6/2023 Dion et al.
11,704,887 B2 7/2023 Saunders et al.
RE50,340 E 3/2025 Dwivedi et al.
2002/0009220 A1 1/2002 Tanaka
2002/0128790 A1 9/2002 Woodmansee
2004/0125208 A1 7/2004 Malone et al.
2004/0207836 A1 10/2004 Chhibber et al.
2004/0254677 A1 12/2004 Brogardh et al.
2005/0146719 A1 7/2005 Chhibber et al.
2005/0167620 A1 8/2005 Cho et al.
2005/0193027 A1 9/2005 Hasegawa et al.
2006/0007177 A1 1/2006 Mclintock
2006/0120588 A1 6/2006 Kwon et al.
2007/0205751 A1 9/2007 Suzuki et al.
2007/0289673 A1 12/2007 Lacroix et al.
2009/0249443 A1 10/2009 Fitzgerald et al.
2009/0253406 A1 10/2009 Fitzgerald et al.
2010/0053604 A1 3/2010 Rice
2010/0169231 A1 7/2010 Bowles et al.
2010/0228676 A1 9/2010 Librizzi et al.
2011/0043798 A1 2/2011 Markwort et al.
2012/0029947 A1 2/2012 Wooldridge et al.
2012/0237908 A1 9/2012 Fitzgerald et al.
2012/0280934 A1 11/2012 Ha et al.
2013/0046611 A1 2/2013 Bowles et al.
2013/0046699 A1 2/2013 Bowles et al.
2013/0121463 A1 5/2013 Nesch et al.
2013/0124426 A1 5/2013 Bowles et al.
2013/0144797 A1 6/2013 Bowles et al.
2013/0154842 A1 6/2013 Chishima
2013/0162548 A1 6/2013 Chen et al.
2013/0191236 A1 7/2013 Bowles
2013/0198089 A1 8/2013 Bowles
2013/0269013 A1 10/2013 Parry et al.
2013/0311318 A1 11/2013 Librizzi et al.
2014/0253494 A1 9/2014 Jiang et al.
2014/0254862 A1 9/2014 Sobczak et al.
2014/0267691 A1 9/2014 Humphrey et al.
2014/0313144 A1 10/2014 Seto et al.
2015/0046343 A1 2/2015 Martini
2015/0082410 A1 3/2015 Fitzgerald et al.
2015/0116481 A1 4/2015 Troy et al.
2015/0123987 A1 5/2015 Hong et al.
2015/0185592 A1 7/2015 Eineren et al.
2015/0206200 A1 7/2015 Edmondson et al.
2015/0309912 A1 10/2015 Nguyen et al.
2015/0324926 A1 11/2015 Nguyen et al.
2015/0330910 A1 11/2015 Nguyen et al.
2015/0339736 A1 11/2015 Bennett
2016/0019685 A1 1/2016 Nguyen
2016/0055778 A1 2/2016 Kim
2016/0171456 A1 6/2016 Bowles
2016/0225036 A1 8/2016 Nguyen
2016/0275460 A1 9/2016 Ploetner et al.
2016/0307309 A1 10/2016 Nguyen et al.
2016/0335616 A1 11/2016 Bordeleau et al.
2017/0023637 A1 1/2017 Yang et al.
2017/0024613 A1 * 1/2017 Shivaram ............... B25J 9/1697
2017/0056928 A1 3/2017 Torrione
2017/0091557 A1 3/2017 Wong et al.
2017/0167986 A1 6/2017 Nguyen et al.
2017/0195069 A1 7/2017 Slavin
2017/0256051 A1 9/2017 Dwivedi et al.
2017/0315007 A1 11/2017 Fitzgerald et al.
2017/0344884 A1 11/2017 Lin et al.
2017/0372465 A1 12/2017 Forutanpour et al.
2018/0165541 A1 6/2018 Amico et al.
2018/0218271 A1 8/2018 Rao et al.
2018/0232875 A1 8/2018 Kanodia et al.
2018/0342050 A1 11/2018 Fitzgerald et al.
2018/0370027 A1 * 12/2018 Oota ..................... G06F 18/217
2019/0073641 A1 3/2019 Utke
2019/0184582 A1 * 6/2019 Namiki .................. H04N 23/90
2019/0266720 A1 8/2019 Dwivedi et al.
2019/0277769 A1 9/2019 Nguyen et al.
2019/0318465 A1 10/2019 Nguyen
2019/0354298 A1 11/2019 Öberg et al.
2019/0385275 A1 12/2019 Kikuchi
2020/0130963 A1 * 4/2020 Diankov .............. G06Q 10/087
2020/0167907 A1 5/2020 Yan et al.

(56) References Cited

U.S. PATENT DOCUMENTS

| | | | |
|---|---|---|---|
| 2020/0202369 A1 | 6/2020 | Datta | |
| 2020/0265487 A1 | 8/2020 | Silva et al. | |
| 2021/0001488 A1 | 1/2021 | Birkmeyer et al. | |
| 2021/0081351 A1 | 3/2021 | Villareal et al. | |
| 2021/0110440 A1 | 4/2021 | Dion et al. | |
| 2021/0182974 A1 | 6/2021 | Wooldridge et al. | |
| 2021/0192484 A1 | 6/2021 | Forutanpour et al. | |
| 2022/0051507 A1 | 2/2022 | Forutanpour et al. | |
| 2022/0067798 A1 | 3/2022 | Forutanpour et al. | |
| 2022/0114854 A1 | 4/2022 | Forutanpour et al. | |
| 2022/0164833 A1 | 5/2022 | Dion et al. | |
| 2022/0198407 A1 | 6/2022 | Beane et al. | |
| 2022/0262189 A1 | 8/2022 | Dion et al. | |
| 2022/0366558 A1* | 11/2022 | Bufi | G06V 10/82 |
| 2023/0007937 A1 | 1/2023 | Forutanpour et al. | |
| 2023/0173676 A1 | 6/2023 | Lonsberry et al. | |
| 2023/0360353 A1 | 11/2023 | Saunders et al. | |
| 2024/0013246 A1 | 1/2024 | Dion et al. | |
| 2025/0086341 A1* | 3/2025 | Abe | B25J 9/1664 |

FOREIGN PATENT DOCUMENTS

| | | | |
|---|---|---|---|
| EP | 3540690 | A1 | 9/2019 |
| EP | 3427198 | B1 | 7/2020 |
| EP | 3731157 | A1 | 10/2020 |
| EP | 4238328 | A1 | 9/2023 |
| ES | 2819699 | T3 | 4/2021 |
| ES | 2820230 | T3 | 4/2021 |
| JP | H01-112382 | A | 5/1989 |
| JP | 2001-264268 | A | 9/2001 |
| JP | 2004-251781 | A | 9/2004 |
| JP | 2008-127029 | A | 6/2008 |
| JP | 2009-032112 | A | 2/2009 |
| JP | 2010-066186 | A | 3/2010 |
| JP | 2012-090231 | A | 5/2012 |
| JP | 2013-114049 | A | 6/2013 |
| JP | 2013-531823 | A | 8/2013 |
| JP | 2015-513135 | A | 4/2015 |
| JP | 2019-114146 | | 7/2019 |
| JP | 2020-126661 | A | 8/2020 |
| JP | 6754843 | B2 | 9/2020 |
| JP | 6934082 | B2 | 9/2021 |
| JP | 7417793 | B2 | 1/2024 |
| JP | 7685555 | B2 | 5/2025 |
| KR | 10-2019-0107593 | A | 9/2019 |
| KR | 10-2019-0116876 | | 10/2019 |
| KR | 10-2020-0115308 | A | 10/2020 |
| WO | 2013/116256 | A1 | 8/2013 |
| WO | 2017/081527 | A1 | 5/2017 |
| WO | 2017/156046 | A1 | 9/2017 |
| WO | 2019/012505 | A1 | 1/2019 |

OTHER PUBLICATIONS

JP Office Action Mailed on Jan. 6, 2026 for JP Application No. 2025064092, 2 page(s).

Extended European Search Report Mailed on Apr. 2, 2026 for EP Application No. 26154828, 9 page(s).

Alvarez, S. et al., "Hierarchical camera auto-calibration for traffic surveillance systems," Expert Systems With Applications, Elsebier, Amsterdam, NL, vol. 41, No. 4, pp. 1532-1542, Sep. 4, 2013.

Bian, Xiao et al., Multiscale Fully Convolutional Network with Application to Industrial Inspection, 2016 IEEE Winter Conference on Applications of Computer Vision (WACV), IEEE, Mar. 7, 2016, pp. 1-8.

CA Office Action Mailed on Nov. 29, 2023 for CA Application No. 3151157, 9 page(s).

Communication about intention to grant a European patent received for EP Application No. 20176606.0, mailed on Nov. 8, 2021, 6 pages.

Decision to grant a European patent received for European Application No. 20176606.0, mailed on Mar. 31, 2022, 2 pages.

Du-Ming Tsai et al., Low-contrast surface inspection of mura defects in liquid crystal displays using optical flow-based motion analysis, Machine Vision and Applications, Springer, Berlin, DE vol. 22, No. 4, Mar. 31, 2010 (Mar. 31, 2010), pp. 629-649, XP019917678, ISSN: 1432-1759, DOI: 10.1007/S00138-010-0256-1.

English language translation of KR patent publication 10-2019-0107593, dated Oct. 7, 2020.

English language translation of KR patent publication 10-2019-0107593, dated Sep. 20, 2019.

English Translation of CA Office Action dated Nov. 28, 2023 for CA Application No. 3163948, 3 page(s).

English Translation of JP Office Action dated Mar. 22, 2023 for JP Application No. 2021135016, 7 page(s).

English Translation of JP Office Action dated Mar. 26, 2024 for JP Application No. 2022516288, 8 page(s).

English Translation of JP Office Action dated Oct. 11, 2022 for JP Application No. 2021135016, 6 page(s).

EP Office Action Mailed on Oct. 24, 2024 for EP Application No. 20789303, 13 page(s).

European Search Report and Search Opinion Received for EP Application No. 20176606.0, mailed on Sep. 28, 2020, 5 pages.

European Search Report and Search Opinion received for EP Application No. 22163056.9, mailed on Jun. 27, 2022, 7 pages.

Examination Report in related Canadian Application No. 3016367 dated Jul. 12, 2019 (4 pages).

Extended European Search Report for EP Application No. 22163056.9 (7 pages), Jun. 27, 2022.

Extended European Search Report Mailed on Dec. 15, 2023 for EP Application No. 21738603, 12 page(s).

Faro, Alberto et al., "Evaluation of the Traffic Parameters in a Metropolitan Area by Fusing Visual Perceptions and CNN Processing of Webcam Images," IEEE Transactions On Neural Networks, IEEE Service Center, Piscataway, NJ, vol. 19, No. 6, pp. 1108-1129, Jun. 1, 2008.

IN Office Action Mailed on Feb. 5, 2024 for IN Application No. 202217022321, 8 page(s).

International Preliminary Report on Patentability received for PCT Patent Application No. PCT/US17/21223, mailed on Sep. 20, 2018, 8 pages.

International Preliminary Report Patentability for PCT/US2020/051046.

International Search Report and Written Opinion from corresponding WO application PCT/US2021/012338, dated Mar. 24, 2021.

International Search Report and Written Opinion received for PCT Patent Application No. PCT/US17/21223, mailed on Jul. 14, 2017, 10 pages.

ISA/EP, International Search Report and Written Opinion for PCT/US2020/051046 mailed Mar. 11, 2021 (16 pages).

JP Office Action Mailed on Mar. 22, 2023 for JP Application No. 2021135016, 5 page(s).

JP Office Action Mailed on Mar. 26, 2024 for JP Application No. 2022516288, 8 page(s).

JPO, Office Action for JP Application No. 2021-135016 issued Oct. 11, 2022.

Kumkang Systems Co., Ltd. (hereinafter Kumkang), KR patent publication English language translation of KR patent publication (10-2019-0107593).

Malaysia Patent Office, Malaysia applicaiton No. PI 2018001472 Substantive Examination and Search Report, Sep. 30, 2021.

Notice of Allowance and Fees Due (PTOL-85) Mailed on Sep. 26, 2024 for U.S. Appl. No. 17/357,106, 5 page(s).

Sprote, Patrick et al., "Concavities, negative parts, and the perception that shapes are complete," Journal of Vision, vol. 13, No. 14, pp. 1-23, Dec. 4, 2013.

Yuan Lunxi et al., The Development and Prospect of Surface Defect Detection Based on Vision Measurement Method, 2016 12th World Congress on Intelligent Control and Automation (WCICA), IEEE, Jun. 12, 2016, pp. 1382-1387.

Zhang Lei et al., Road Crack Detection Using Deep Convolutional Neural Network, 2016 IEEE International Conference on Image Processing (ICIP), IEEE, Sep. 25, 2016, pp. 3708-3712.

(56) References Cited

OTHER PUBLICATIONS

Zhang, Wei et al., "Multilevel Framework to Detect and Handle Vehicle Occlusion," IEEE Transactions On Intelligent Transportation Systems, IEEE, Piscataway, NJ, vol. 9, No. 1, Mar. 1, 2008.
ISA/220—Notification of Transmittal or Search Report and Written Opinion of the ISA, or the Declaration Mailed on Apr. 2, 2025 for WO Application No. PCT/US24/059857, 17 page(s).
Schrimpf, Johannes et al., "Real-Time System Integration in A Multi-Robot Sewing Cell,", Oct. 7, 2012, 2012 IEEE/RSJ International Conference on Intelligent Robots and Systems, 2724-2729.
Schrimpf, Johannes et al., "Work Flow, Material Handling and Initial Part Positioning in a Multi-Robot Sewing Cell,", Jan. 1, 2015, IFAC-Papersonline, 45-50, 48, No. 19.
Schrimph, Johannes et al., "Model-Based Feed-Forward and Setpoint Generation in a Multi-Robot Sewing Cell,", May 26, 2015, IEEE International Conference on Robotics and Automation, 2027-2033.
Non-Final Rejection Mailed on Dec. 29, 2025 for U.S. Appl. No. 18/990,662, 31 page(s).
English Translation of JP Office Action dated Nov. 19, 2024 for JP Application No. 2022541874, 6 page(s).
JP Office Action Mailed on Nov. 19, 2024 for JP Application No. 2022541874, 6 page(s).
IN Office Action Mailed on Feb. 25, 2025 for IN Application No. 202428005433, with English translation, 8 page(s).
Communication about intention to grant a European patent Mailed on Jan. 7, 2020 for EP Application No. 17763941, 6 page(s).
Communication about intention to grant a European patent Mailed on Jan. 15, 2020 for EP Application No. 19173269, 6 page(s).
Decision to grant a European patent Mailed on Jun. 12, 2020 for EP Application No. 17763941, 2 page(s).
Decision to grant a European patent Mailed on Jun. 12, 2020 for EP Application No. 19173269, 2 page(s).
Extended European Search Report Mailed on Jul. 26, 2019 for EP Application No. 17763941, 5 page(s).
Extended European Search Report Mailed on Jul. 26, 2019 for EP Application No. 19173269, 5 page(s).
Non-Final Rejection Mailed on Feb. 20, 2025 for U.S. Appl. No. 18/748,913, 13 page(s).
Non-Final Rejection Mailed on Jul. 2, 2026 for U.S. Appl. No. 18/892,095, 24 page(s).

* cited by examiner

METHODS, SYSTEMS, APPARATUSES, AND COMPUTER PROGRAM PRODUCTS FOR FOLLOWING AN EDGE OF AN OBJECT

CROSS-REFERENCE TO RELATED APPLICATIONS

This application is a non-provisional of and claims the benefit of U.S. Provisional Patent Application No. 63/614,938, filed Dec. 27, 2023, which is hereby incorporated by reference in its entirety.

TECHNICAL FIELD

Embodiments of the present disclosure are generally directed to a control system, apparatuses, and methods for performing one or more actions or processes on objects using multi-axis robots and one or more tools. In particular, some embodiments of the present disclosure relate to edge-following systems configured to facilitate imaging of an edge of an object, such as a mobile device, and various reverse-logistical operations associated therewith.

BACKGROUND

Object handling systems require precise control and coordination between a number of different devices. In a reverse-logistics context, such as computing device diagnostics, the complex shapes of the objects (e.g., the edge contours of mobile devices) may further complicate the control systems required to handle the objects while working on the objects in multiple locations with one or more tools. Applicant has discovered various technical problems associated with conventional methods, systems, and tools for controlling such handling systems and for managing the reverse-logistics of such computing devices. Through applied effort, ingenuity, and innovation, Applicant has solved many of these identified problems by developing the embodiments of the present disclosure, which are described in detail below.

BRIEF SUMMARY

In an embodiment, a computer-implemented method for following at least a portion of an edge of an object via an edge-following system, the computer-implemented method including an edge-following operation. The edge-following operation may include at least determining one or more dimensional attributes associated with the object; causing a handling tool associated with a multi-axis robot to engage the object; defining a working point on the edge of the object. The working point may be kept at a predetermined working offset from an ancillary tool associated with the edge-following system. The edge-following operation may further include causing movement of the multi-axis robot to manipulate the object via the handling tool such that the working point is configured to move along the edge of the object from a first location on a first side of the edge of the object to a second location along a second side of the edge of the object while maintaining the predetermined working offset continuously between the ancillary tool and the working point. The edge of the object may include surfaces along a plurality of sides connected with corners, and the plurality of sides may include the first side and the second side.

In some embodiments, the ancillary tool is an image capturing device, and the method may further include capturing, via the image capturing device, image data associated with the edge of the object during execution of the edge-following operation, and generating, based on the image data, a continuous image of the edge of the object from the first location to the second location, including a first corner disposed between the first side and the second side. The method may further include inputting the continuous image into an anomaly detection model and detecting, based on an output generated by the anomaly detection model, one or more physical defects associated with the edge of the object. The predetermined working offset may be defined at least in part by a predetermined focal length of a lens of the image capturing device.

In some embodiments, the method may include determining a working orientation of the working point of the object relative to the image capturing device after causing the handling tool to engage the object. The working orientation and working offset may be configured to be controlled by the handling tool of the multi-axis robot such that the working point on the edge of the object remains in focus of the image capturing device during the edge-following operation.

The one or more dimensional attributes associated with the object may be determined via an object localization vision model, and the one or more dimensional attributes may include at least one of a length, a width, a depth, a corner location, a corner radius (e.g., radius of curvature), a center, an area, a position, an orientation, or any other external physical characteristics of the object.

In some embodiments, executing the edge-following operation further includes determining, based at least in part on the one or more dimensional attributes, one or more points of rotation associated with the object. The one or more points of rotation may be associated with a corner radius of the object.

In some embodiments, causing the movement of the multi-axis robot to manipulate the object includes executing a sequence of alternately translating the object linearly along one or more of an x-axis or a y-axis of a particular coordinate plane and rotating the object based in part on one or more points of rotation to capture image data associated with the plurality of sides and the corners comprised in the edge of the object.

In some embodiments, causing the handling tool associated with the multi-axis robot to engage the object further includes engaging the object based in part on the one or more dimensional attributes associated with the object.

In some embodiments, the one or more dimensional attributes include exterior dimensions of the object as measured by an object localization vision model, and the edge-following system may be configured to perform the edge-following operation based solely on the exterior dimensions.

An embodiment of the present disclosure may include an edge-following system for following an edge of an object. The edge-following system may include at least one processor and at least one non-transitory memory including computer-coded instructions thereon, the computer-coded instructions, when executed by the at least one processor, may cause the edge-following system to determine one or more dimensional attributes associated with the object; cause a handling tool associated with a multi-axis robot to engage the object; and define a working point on the edge of the object; and cause movement of the multi-axis robot to manipulate the object via the handling tool such that the working point is configured to move along the edge of the object from a first location on a first side of the edge of the object to a second location along a second side of the edge of the object while maintaining the predetermined working offset continuously between the ancillary tool and the working point. The working point may be kept at a predetermined working offset from an ancillary tool associated with the edge-following system. The edge of the object may include surfaces along a plurality of sides connected with corners, and the plurality of sides may include the first side and the second side.

In some embodiments, the computer-coded instructions, when executed by the at least one processor, further cause the edge-following system to capture, via the image capturing device, image data associated with the edge of the object and generate, based on the image data, a continuous image of the edge of the object from the first location to the second location, including a first corner disposed between the first side and the second side. The computer-coded instructions, when executed by the at least one processor, may further cause the edge-following system to input the continuous image into an anomaly detection model and detect, based on an output generated by the anomaly detection model, one or more physical defects associated with the edge of the object. The predetermined working offset may be defined at least in part by a predetermined focal length of a lens of the image capturing device. The computer-coded instructions, when executed by the at least one processor, may further cause the edge-following system to determine a working orientation of the working point of the object relative to the image capturing device after causing the handling tool to engage the object. The working orientation and working offset may be configured to be controlled by the handling tool of the multi-axis robot such that the working point on the edge of the object remains in focus of the image capturing device.

In some embodiments, the one or more dimensional attributes associated with the object may be determined via an object localization vision model, and the one or more dimensional attributes may include at least one of a length, a width, a depth, a corner location, a corner radius (e.g., radius of curvature), a center, an area, a position, an orientation, or any other external physical characteristics of the object.

The computer-coded instructions, when executed by the at least one processor, may further cause the edge-following system to determine, based at least in part on the one or more dimensional attributes, one or more points of rotation associated with the object. The one or more points of rotation may be are associated with a corner radius of the object.

In some embodiments, causing the movement of the multi-axis robot to manipulate the object includes executing a sequence of alternately translating the object linearly along one or more of an x-axis or a y-axis of a particular coordinate plane and rotating the object based in part on one or more points of rotation to capture image data associated with the plurality of sides and the corners comprised in the edge of the object.

In some embodiments, causing the handling tool associated with the multi-axis robot to engage the object may further include engaging the object based in part on the one or more dimensional attributes associated with the object.

The one or more dimensional attributes may include exterior dimensions of the object as measured by an object localization vision model, and the edge-following system may be configured to use solely the exterior dimensions to define the working point.

An embodiment of the present disclosure may include at least one non-transitory computer-readable storage medium for following an edge of an object. The at least one non-transitory computer-readable medium may have computer program code stored thereon that, in execution with at least one processor, configures the at least one processor to determine one or more dimensional attributes associated with the object; cause a handling tool associated with a multi-axis robot to engage the object; define a working point on the edge of the object; and cause movement of the multi-axis robot to manipulate the object via the handling tool such that the working point is configured to move along the edge of the object from a first location on a first side of the edge of the object to a second location along a second side of the edge of the object while maintaining the predetermined working offset continuously between the ancillary tool and the working point. The working point may be kept at a predetermined working offset from an ancillary tool associated with the edge-following system. The edge of the object may include surfaces along a plurality of sides connected with corners, and the plurality of sides may include the first side and the second side.

The computer program code may further configure the at least one processor to capture, via the image capturing device, image data associated with the edge of the object and generate, based on the image data, a continuous image of the edge of the object from the first location to the second location, including a first corner disposed between the first side and the second side. The computer program code may further configure the at least one processor to input the continuous image into an anomaly detection model and detect, based on an output generated by the anomaly detection model, one or more physical defects associated with the edge of the object. The predetermined working offset may be defined at least in part by a predetermined focal length of a lens of the image capturing device. The computer program code may further configure the at least one processor to determine a working orientation of the working point of the object relative to the image capturing device after causing the handling tool to engage the object. The working orientation and working offset may be configured to be controlled by the handling tool of the multi-axis robot such that the working point on the edge of the object remains in focus of the image capturing device.

The one or more dimensional attributes associated with the object may be determined via an object localization vision model, and the one or more dimensional attributes comprise at least one of a length, a width, a depth, a corner location, a corner radius (e.g., radius of curvature), a center, an area, a position, an orientation, or any other external physical characteristics of the object.

In some embodiments, the computer program code further configures the at least one processor to determine, based at least in part on the one or more dimensional attributes, one or more points of rotation associated with the object. The one or more points of rotation may be associated with a corner radius of the object.

Causing the movement of the multi-axis robot to manipulate the object may include executing a sequence of alternately translating the object linearly along one or more of an x-axis or a y-axis of a particular coordinate plane and rotating the object based in part on one or more points of rotation to capture image data associated with the plurality of sides and the corners comprised in the edge of the object.

Causing the handling tool associated with the multi-axis robot to engage the object may further include engaging the object based in part on the one or more dimensional attributes associated with the object.

In some embodiments, the one or more dimensional attributes comprise exterior dimensions of the object as measured by an object localization vision model, and the edge-following system is configured to use solely the exterior dimensions to define the working point.

Various other embodiments are also described in the following detailed description and in the attached claims.

BRIEF DESCRIPTION OF THE SEVERAL VIEWS OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein. To easily identify the discussion of any particular element or act, the most significant digit or digits in a reference number refer to the figure number in which that element is first introduced.

DETAILED DESCRIPTION

Figure 1:
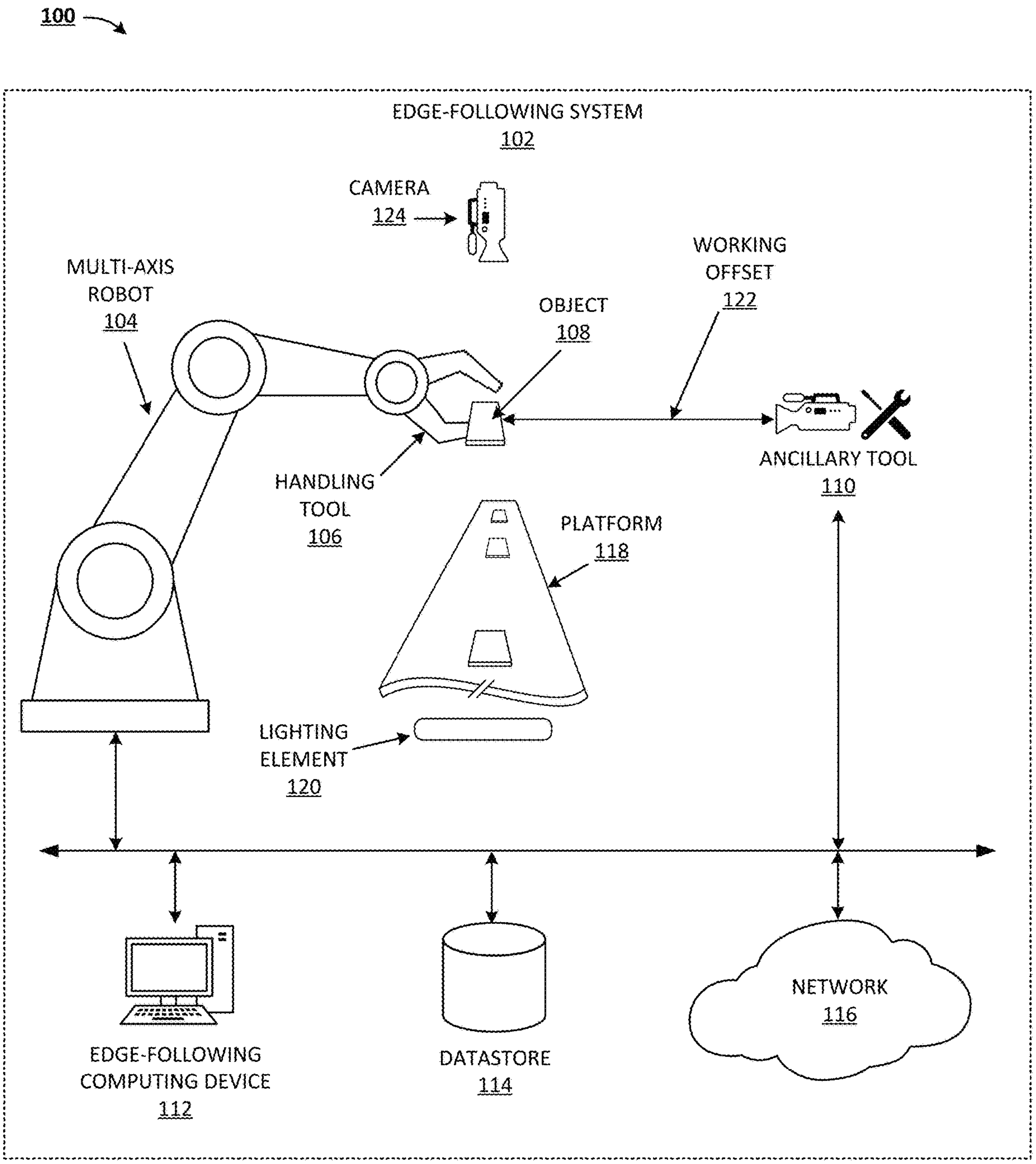
FIG. 1 is a diagram of an exemplary environment configured for following at least a portion of an edge of an object in accordance with one or more embodiments of the present disclosure.

Various embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. The terms "illustrative," "example," and "exemplary" are used to be examples with no indication of quality level or preference. Like numbers refer to like elements throughout.

Overview

Computing devices such as mobile devices including smartphones and tablet computers are now ubiquitous amongst the general public, and new makes and models of mobile devices are released frequently. Managing the reverse-logistics for an enterprise operation dealing with the intake, inspection, refurbishment, and redistribution of mobile devices can be an untenable task requiring substantial amounts of hardware and processing resources and for which every incremental improvement in automation returns significant efficiency and speed improvements for the system. One of the biggest challenges for enterprises that deal in the reverse-logistics of mobile devices is filtering out the mobile devices that do not meet quality control standards. Before an enterprise spends the technological resources to refurbish, reformat, recondition, repair, redistribute, and/or otherwise manage a mobile device, it is desirable to know whether the mobile device has any physical damages that preclude the mobile device from being reused and/or redistributed on the public market, and in some instances, allocating one or more particular logistical channels to a device based on its condition. When inspecting objects such as mobile devices (e.g., mobile phones, tablet computers, and/or the like), it is especially difficult and time consuming to determine whether there is physical damage on the edge of a respective mobile device, where the edge comprises the surfaces that make up the plurality of sides and corners of the respective mobile device with various makes and models of such mobile devices having a variety of dimensions. In a high-volume reverse-logistics environment, correctly identifying one or more physical defects associated with one or more mobile devices (e.g., physical damage on the edge of a respective mobile device) is technically complex and an inefficient process. Furthermore, as will be described herein, current solutions to these problems are inefficient and consume large amounts of technical resources.

The aforementioned reverse-logistics systems may use one or more control systems, which may control various devices, such as a multi-axis robot and/or one or more ancillary tools (e.g., a camera) to manipulate and perform work on various objects (e.g., mobile devices). Existing control systems suffer from numerous deficiencies associated with detecting the location and orientation of the objects, engaging, and manipulating the objects (e.g., via a multi-axis robot), working on the objects using one or more tools (e.g., optimizing the work via relative position control between the object and the tool(s)), and processing and analysis of the resulting work (e.g., image compositing and analysis). In this regard, Applicant has addressed these and other technical problems by inventing various methods, systems, and apparatuses capable of one or more edge-following operations, including but not limited to solving each of the foregoing deficiencies, both alone and in various combinations. In some embodiments, Applicant has developed one or more methods, systems, and apparatuses capable of automatically diagnosing the condition of an edge of a mobile device without requiring, although not precluding in all situations, any prior manual inspection of the mobile device by a user, such as a human operator.

Embodiments of the present disclosure comprise an edge-following system capable of automatically engaging and manipulating an object and/or one or more ancillary tools as part of an edge-following operation. The edge-following operation may include causing the relative movement of the object and the one or more ancillary tools in a manner configured to keep a working offset between a working point on the surface of the object and the one or more ancillary tools. The working point may be moved along the surface of the object to facilitate consistent working, via the working offset, while also performing the work along a length of the surface of the object (e.g., some or all of the edge of the object). In some embodiments, the control system may be configured to maintain a working offset and a working orientation (e.g., an angle between the surface of the object at the working point and an angle of the ancillary tool(s)) between the ancillary tool(s) and the object.

In some embodiments, the ancillary tool(s) may include a camera configured to image the surface of an object (e.g., the edge of the mobile device). The camera may image the surface as the object is manipulated by the multi-axis robot to move the working point along the surface of the object while maintaining the working offset between the camera and the object. In this manner, the working point may define a focal point of the camera, such that moving the working point along the surface of the object captures image data for multiple locations along the object surface. The working offset may be configured to generate consistent image data despite the relative movement between the object and the camera, such that the camera image data may be composited into a continuous image comprising the entire imaged surface of the object or a portion thereof taken from a consistent offset. In some embodiments, maintaining a working orientation and a working offset between the working point on the surface of the object and the cameras may generate further improved continuous images, which may appear to be a single flat image comprising the entire surface imaged, even when such surfaces include corners and other non-flat portions. In some embodiments, the multi-axis robot may instead manipulate the camera while the object remains stationary without departing from the scope of the present disclosure. In some embodiments, the multi-axis robot manipulates the camera and a second multi-axis robot manipulates the object so that each the camera and the object moves relative to the other when the camera is imaging the surface of the object without departing from the scope of the present disclosure. For example, neither the camera nor the object remain stationary when the camera is imaging the surface of the object, in some embodiments. In some embodiments, the multi-axis robot manipulates both the camera and the object so that each the camera and the object moves relative to the other, via two separate end effectors, when the camera is imaging the surface of the object without departing from the scope of the present disclosure.

In some embodiments, the edge-following operation may further be configured to determine and diagnose the condition of an edge of the object, such as by detecting one or more physical defects using an anomaly detection model. The edge-following system may include one or more multi-axis robots, one or more ancillary tools, one or more computing devices, one or more image capturing devices, one or more datastores, and/or a networking environment configured to facilitate communication between the aforementioned components of the edge-following system.

In various contexts, the surfaces associated with the plurality of sides of the edge of the object can be composed of various materials including, but not limited to, glass, plastic, rubber, vinyl, composite materials, aluminum, wood, and/or the like. As such, the edge-following system is configured to analyze a plurality of objects constructed in various materials to determine whether one or more physical defects are present on an edge of a respective object of the plurality of objects.

Embodiments of the present disclosure can employ one or more models, such as one or more machine learning (ML) models, machine vision models, neural networks (e.g., convolutional neural networks (CNNs)), and/or other types of models, such as other types of deep-learning models, to determine a condition of an edge of an object. For example, in various embodiments, the edge-following system utilizes an object localization vision model and/or an anomaly detection model as part of the edge-following operation in order to complete various tasks such as, for example, determining a location and/or orientation of a particular object (e.g., prior to or following engagement of the object with a handling tool of the multi-axis robot), determining one or more dimensional attributes associated with the particular object, generating a continuous image of the edge of the object, analyzing image data (e.g., the continuous image) to detect one or more physical defects associated with an edge of the particular object, and/or the like.

As described herein, in some embodiments, the edge-following system can identify, receive, retrieve, measure, and/or otherwise determine one or more dimensional attributes associated with a respective object. For example, the edge-following system may employ an object localization vision model to determine the one or more dimensional attributes associated with a respective object. For at least this purpose, one or more cameras associated with the edge-following system can be oriented above a platform supporting the respective object (e.g., a conveyor belt) and capture image data related to the object. In some embodiments, the platform can be transparent and backlit by one or more lighting elements, or may otherwise facilitate backlighting of the object, to allow imaging of a silhouette of the object. Sensor exposure time of the one or more cameras may be tailored to allow ample visibility of the entire silhouette of the object and prevent distortion or "washing out" of lighter pixels of the curved edges of the object.

In some embodiments, the handling tool of the multi-axis robot may engage the object (e.g., pick up the object) prior to the one or more cameras capturing the image data related to the object. The handling tool may be engaged with the object (e.g., holding the object) while the one or more cameras capture the image data related to the object. In some embodiments, the image data related to the object is image data related to the silhouette of the object.

Based on the image data related to the object, such as image data related to the silhouette of the object, the object localization vision model can determine the one or more dimensional attributes associated with the respective object. The one or more dimensional attributes can include, but are not limited to, at least one of a length, a width, a depth, a corner location, a corner radius (e.g., radius of curvature), a center, an area, a position, an orientation, or any other external physical characteristics of the object. Determining the one or more dimensional attributes associated with the respective object can occur prior to or after the handling tool engages with the object. In some embodiments, at least the center of the device may be determined prior to engagement of the handling tool with the object (e.g., engagement at the determined center). In some embodiments, other dimensional attributes (e.g., length and width) may be determined before or after engagement with the handling tool.

Figure 8:
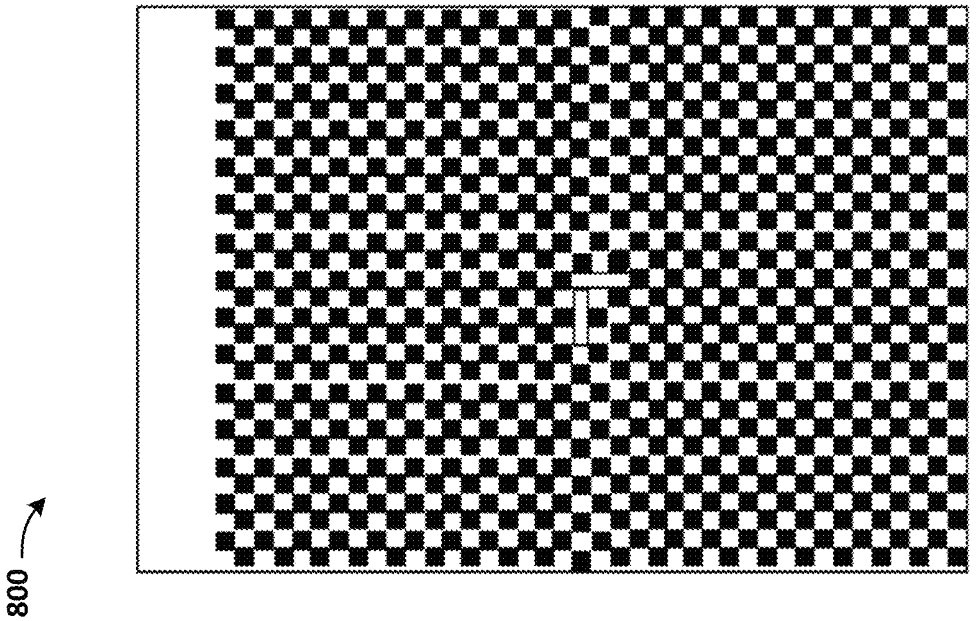
FIG. 8 illustrates a view of a calibration grid in accordance with one or more embodiments of the present disclosure.

Additionally or alternatively, in some embodiments, the object localization vision model may be configured to directly measure the one or more dimensional attributes (e.g., using image data, such as image data related to the silhouette of the object, to determine a length, width, etc. of the object based on a predetermined reference length in the image data and/or calibration of the camera and platform locations to enable measurement of dimensions), to programmatically calculate one or more dimensional attributes (e.g., a surface area calculated from a length and a width). For example, image data may be processed through an image calibration tool to reduce or eliminate image warping, which may enable accurate pixel to measurement conversions, such as pixel to millimeter conversions or pixel to inches conversions. The image calibration tool may be calibrated prior to receiving the image data of the object by using an image of a calibration grid 800 (FIG. 8) with known dimensions that is acquired using the same hardware setup (e.g., the same camera and/or multi-axis robot).

Additionally or alternatively, in some embodiments, the object localization vision model may be configured to indirectly determine the one or more dimensional attributes (e.g., read, via image data and/or electronic transmission data from the object and/or a third-party computing device, data associated with the object, which data may include dimensional attributes or other data, such as make and model data, from which the dimensional attributes may be determined), or to otherwise gather or determine the one or more dimensional attributes, as depicted in FIGS. 9-13. In some embodiments, electronic data associated with the object, such as from a wired or wireless connection, may supply additional or alternative data configured to facilitate determining the one or more dimensional attributes (e.g., dimensional attributes stored in memory of the object, a make/model of the object from which dimensional attributes can be retrieved from a database, or the like).

Figure 9:
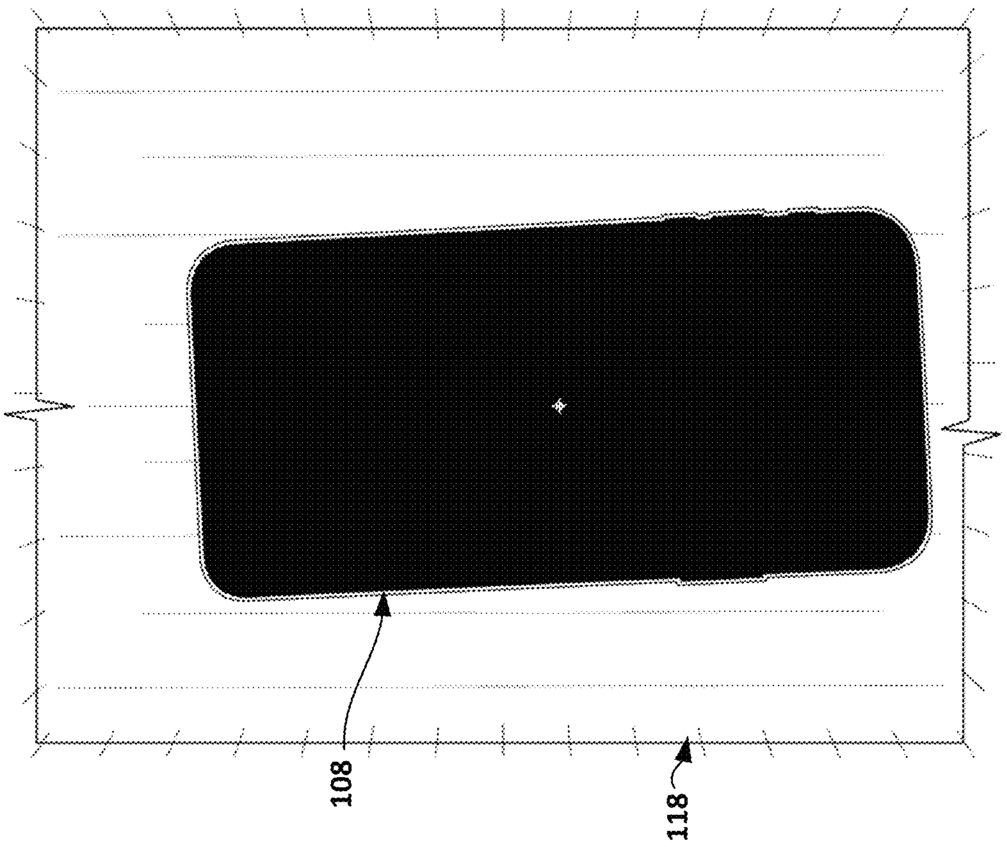
FIGS. 9-13 illustrate views of image data related to the silhouette of an object in accordance with one or more embodiments of the present disclosure.
Figure 11:
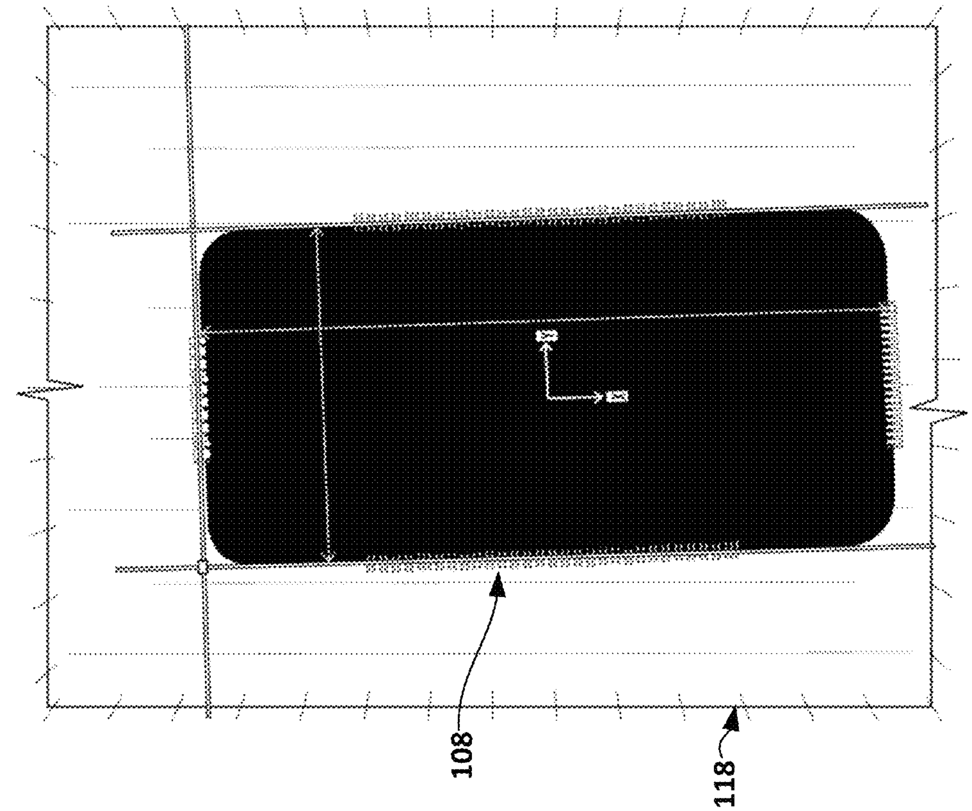
Figure 10:
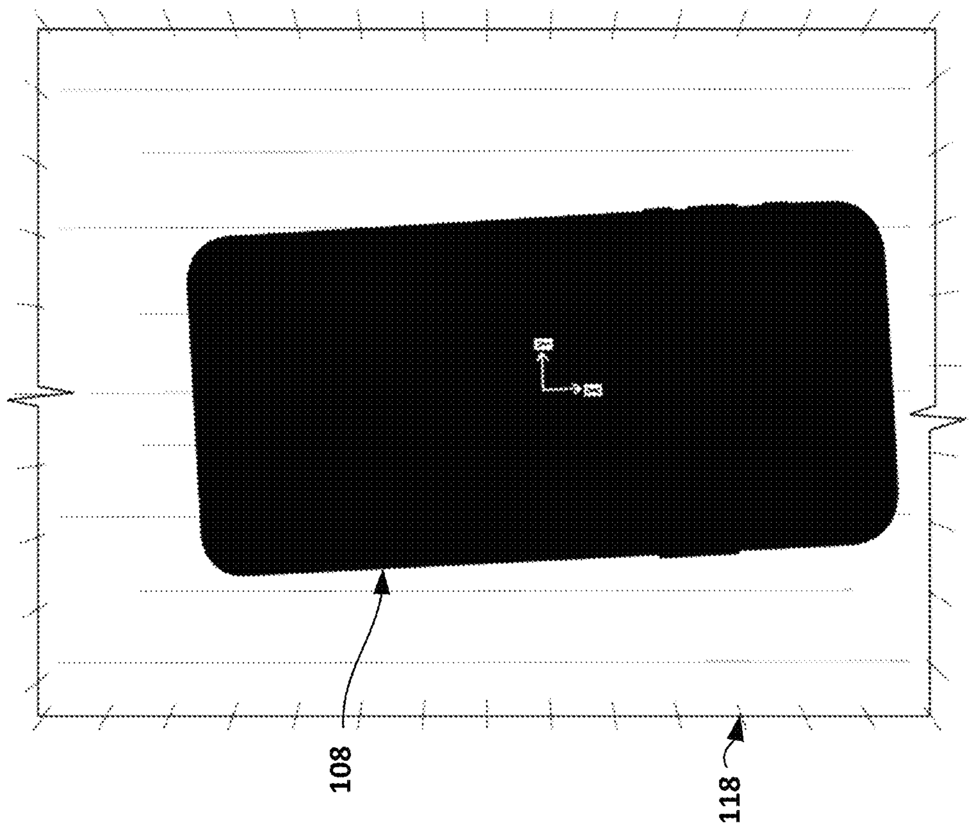
Figure 12:
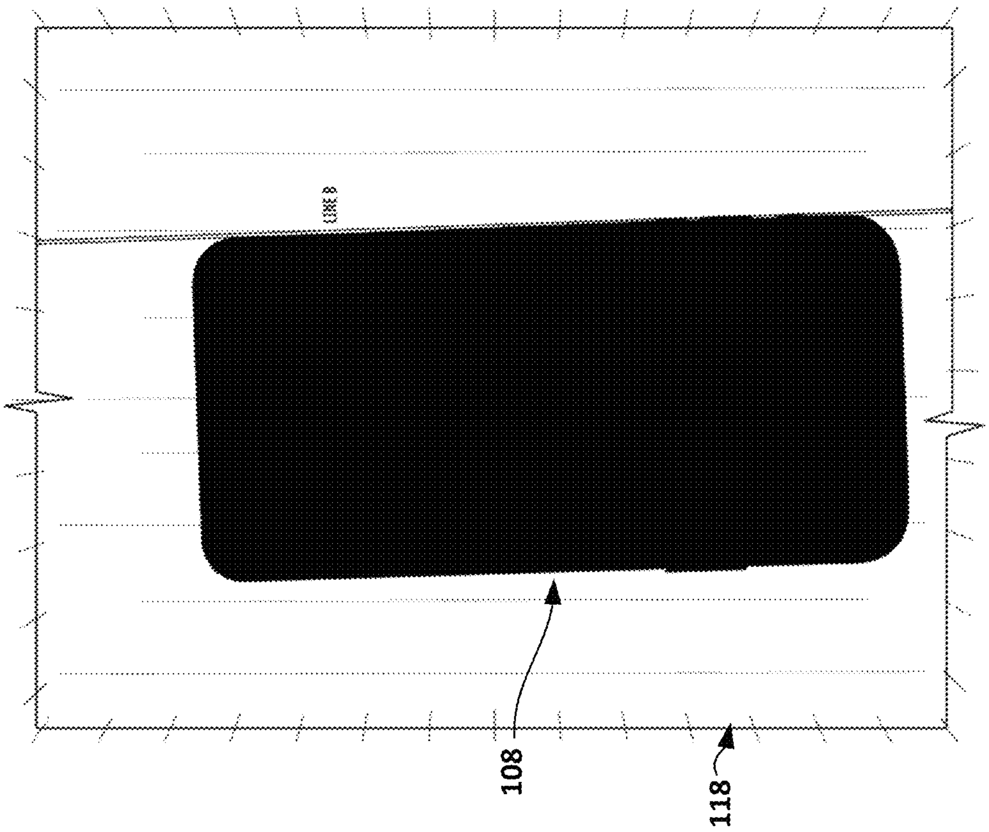
Figure 13:
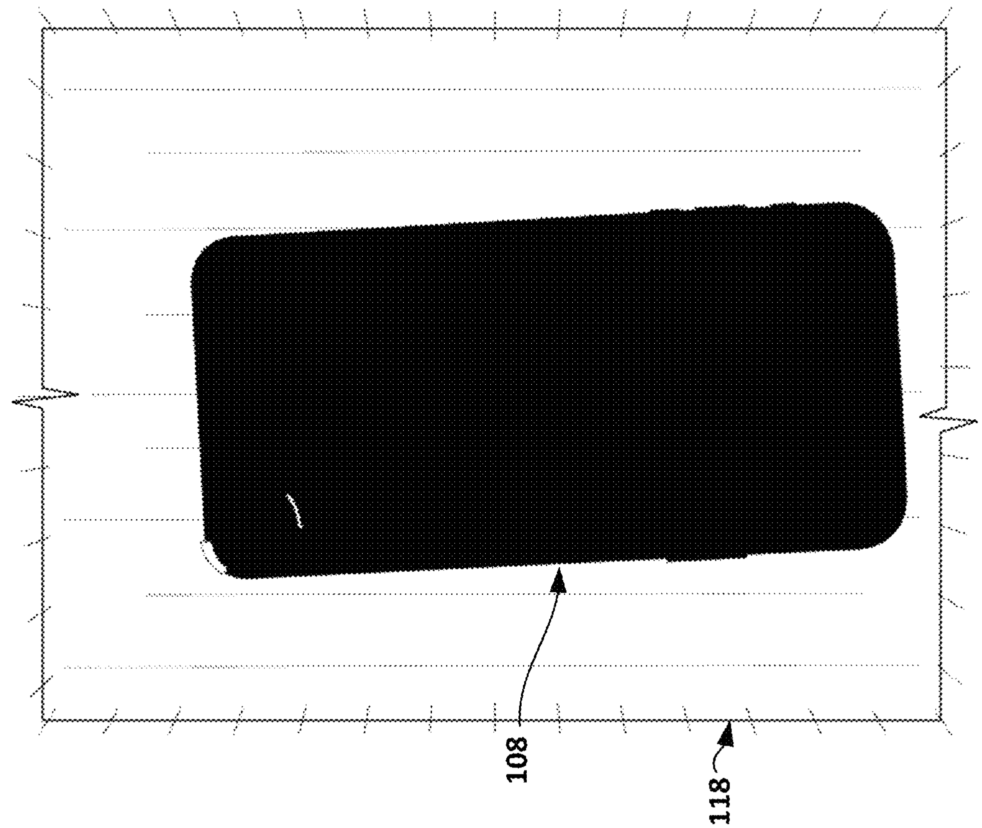

Based in part on the dimensional attributes of the object, one or more reference points associated with the object, such as the center or edge of the object, as depicted in FIGS. 9-13, can be determined in order to facilitate the execution of actions and/or manipulations of the object by, for example, the multi-axis robot and/or the ancillary tool(s). The one or more reference points associated with the edge of the object can be used in a motion-planning model related to the edge-following operation and can include, but are not limited to, a center-of-object, a starting point, a working point, and/or one or more points of rotation. In some embodiments, image data, such as the image data related to the silhouette of the object, may be processed through a blob tool, which may be used to differentiate the lighter colored background pixels (e.g., pixels that are associated with backlighting the object) from the darker pixels (e.g., pixels that are associated with the object) in the image, as depicted in FIG. 9. The blob tool may locate the "center mass" of the darker pixels and may provide x and y axis coordinates of the object's center relative to the taught (0,0) pick position. The image data may be processed through a fixture tool that may be used to set the newly found object center (i.e., the x and y axis coordinates) as one of the reference points associated with the object (e.g., a zero reference point) for subsequent processes, such as the motion-planning model related to the edge-following operation, as depicted in FIG. 10. In some embodiments, image data, such as the image data related to the silhouette of the object, may be processed through at least one edge detection tool that may be used to locate and measure all edges of the object, as depicted in FIG. 11. In some embodiments, image data, such as the image data related to the silhouette of the object, may be processed through an angle measurement tool that may measure the angle between an edge of the object (e.g., "LINE 8" in FIG. 12) and a preset line running parallel to the conveyor, which may return the angle of the phone relative to the angle of the gripper at the taught position (0 degrees), as depicted in FIG. 12. In some embodiments, image data, such as the image data related to the silhouette of the object, may be processed through an arc measurement tool that may be placed at the intersection of two previously found object edges and the radius of a phone corner arc may be calculated, as depicted in FIG. 13. In some embodiments, the foregoing tools may be embodied as one or more processors running computer program code having instructions configured to carry out the function associated with the respective tools. In some embodiments, one or more processors responsible for other functions described herein may also execute one or more functions of the tools.

The edge-following operation may comprise a motion-planning model configured to plan and/or execute the motion of one or more devices, objects, or other elements associated with the various systems and embodiments discussed herein. The motion-planning model may be configured to determine the movement of the object (e.g., via determining computer-coded movement instructions for the multi-axis robot) and/or ancillary tool necessary to control the relative position and/or orientation between the object and the ancillary tool. The motion-planning model may comprise computer-coded instructions configured to determine one or more points of rotation and determine instructions to rotate the object and/or ancillary tool about the point(s) of rotation. The computer-coded instructions may be transmitted to the multi-axis robot and executed by the multi-axis robot to facilitate the relative movement between the object and the ancillary tool(s). The motion-planning model may further be configured to connect the rotational movement associated with two or more points of rotation with a translational movement associated with a linear side of the object. By way of non-limiting example, using a predetermined or arbitrarily chosen starting point on the edge of the object, the path followed to keep the working point of the followed edge in the same point in space relative to the ancillary tool is determined by a motion-planning model that comprises finding new x and y points of the center of the object in space (e.g., on a particular coordinate plane) when rotating the object in order to execute to the one or more processes on the edge of the object (e.g., the one or more image data capturing processes). If the object has a rectangular shape (with or without curved edges), there would be four points of rotation associated with the object to be chained together with a translational motion along the edges of the object. As such, the edge-following system can identify four points of rotation and link the points of rotation by a translational motion perpendicular to the direction of the ancillary tool. A purely rectangular object with ninety degree edges may include points of rotation directly on the corners, and a rectangular object with curved edges may include points of rotation further inboard from the edges as described herein.

The edge-following operation may be configured so that a working point on the edge of the object stays in the same point in space relative to the ancillary tool(s) (e.g., a same point on the particular coordinate plane defined by the tool(s)) for the duration of the edge-following operation while the edge moves perpendicularly past the ancillary tool (e.g., to create the relative impression of a flat, linear edge moving at a fixed distance and orientation relative to the ancillary tool in spite of the non-linear shape of the edge). Various measurements, offsets, and/or orientations related to the object and/or the one or more components of the edge-following system may be determined. For example, as a result of the edge-following operation, one or more of a working offset and/or a working orientation may be determined to ensure the edge of the object stays in the same point in space throughout the duration of the edge-following operation.

In various embodiments, the ancillary tool associated with the edge-following system is configured as an image capturing device (e.g., a camera) configured to capture one or more portions of image data related to an edge of a respective object during the execution of a respective edge-following operation. The one or more portions of image data can be directly or indirectly used to make a continuous image of the edge of the object. The continuous image may be a programmatically generated image comprising multiple combined portions of image data (e.g., a composite image comprising multiple images or portions of images). In various embodiments of the present disclosure, the continuous image representing at least a portion of one or more surfaces of an object. In some embodiments, the continuous image may represent a three-dimensional object as a two-dimensional image by compositing images captured from multiple surfaces (e.g., multiple sides and/or corners) of an object in a single linear image (e.g., a single flat image). In combination with maintaining the working offset and/or working orientation, the resulting continuous image may appear to be a single image of some or all of the edge of the object.

The continuous image of the edge of the object may be a composite image made up of a plurality of still photos and/or video data captured of the edge of the object as the object is manipulated (e.g., rotated and/or translated) by the multi-axis robot. As such, the continuous image of the edge of the object comprises data related to the plurality of sides and corners associated with the edge of the object. In such embodiments, a continuous image of an edge of a respective object can be inputted into an anomaly detection model associated with the edge-following system and the anomaly detection model can determine whether one or more physical defects exist on the edge of the respective object captured in the continuous image of the edge of the object.

Embodiments of the present disclosure offer myriad technical advantages for object handling, control systems, and/or the reverse-logistics industry. Embodiments of the present disclosure greatly reduce the time and technical resources necessary to inspect and diagnose the condition of the respective edges of a large plurality of objects by employing an edge-following system to automatically execute edge-following operations on the large plurality of objects quickly, accurately, and efficiently. For example, embodiments of the present disclosure can capture a single, continuous image of an edge of a respective object during an edge-following operation, whereas traditional solutions must capture multiple images (e.g., four to eight separate images) in order to capture adequate image data related to the sides and corners of a respective object. The edge-following operation may thereby reduce the amount of physical hardware required (e.g., by using only a single image capturing device for generating the continuous image in some embodiments). Moreover, a single continuous image may reduce the processing power, training time, analysis time, model complexity, and number of distinct processing steps required of the anomaly detection model by reducing the number of images for processing and ensuring more accurate, consistent training and input data for the model.

Furthermore, traditional solutions make inefficient use of time and technical resources while manipulating a respective object to get the object into a particular orientation. Embodiments of the present disclosure provide methods for following an edge of a respective object in one continuous motion without pausing to re-orient the object and/or the robot responsible for manipulating the object. In a high-volume reverse-logistics environment, such reductions in movement and handling may greatly expedite the process and throughput of the system. Moreover, it will be appreciated that the edge-following system associated with embodiments of the present disclosure is improved over time as the associated anomaly detection model and/or object localization vision model become more accurate and efficient over time through iterative model training based on data collected while performing the one or more methods described herein. The aforementioned benefits are some, but not all, of the advantages of the various systems, apparatuses, and methods discussed herein, and more may become apparent to those of ordinary skill in the art in light of the present disclosure.

Definitions

"Edge-following system" refers to a system comprising hardware, software, or a combination of hardware and software configured to control the relative position and/or orientation of an object and/or a tool (e.g., an ancillary tool as discussed herein). In some embodiments, the edge-following system may include one or more multi-axis robots, one or more edge-following computing devices, one or more ancillary tools, one or more cameras, one or more data stores, and/or computer-coded instructions (e.g., one or more software applications) that is configured for execution via the one or more computing devices and/or stored in one or more data store(s). The edge-following computing devices may, in conjunction with the various other components associated with the edge-following system, facilitate the execution of an edge-following operation for a respective object of interest. In one or more embodiments, the various software and/or hardware components of the edge-following system may communicate via one or more networks. For example, the one or more multi-axis robots, the one or more edge-following computing devices, the one or more ancillary tools, the one or more cameras, and/or the one or more datastores can communicate via one or more networks.

In various contexts, the edge-following system can be embodied by an enterprise-scale reverse-logistics system configured to assess, diagnose, recondition, refurbish, reformat, repair, and/or otherwise manage one or more objects of interest such as, for example, one or more mobile devices. In one or more contexts, the edge-following system can execute an edge-following operation for a particular object in order to determine whether there are one or more physical defects associated with the object. For example, based on the edge-following operation, the edge-following system can determine whether there are one or more physical defects associated with an edge of a particular object, where the edge of the particular object comprises surfaces along a plurality of sides connected with corners. In various contexts, the surfaces associated with the plurality of sides of the edge of the object can be composed of various materials including, but not limited to, glass, plastic, rubber, vinyl, composite materials, aluminum, wood, and/or the like. As such, the edge-following system is configured to analyze a plurality of objects constructed in various materials to determine whether one or more physical defects are present on an edge of a respective object of the plurality of objects. In some embodiments, detection of one or more physical defects may be used by the enterprise-scale reverse-logistics system to control the repair (e.g., identification and installation of parts) or disposition (e.g., identifying components for recycling) of the object.

In one or more embodiments, the edge-following system comprises, embodies, and/or otherwise integrates with one or more models, such as one or more machine learning (ML)

models or other processes, configured to execute one or more processes related to the edge-following operation. For example, in various embodiments, the edge-following system utilizes an object localization vision model and/or an anomaly detection model as part of the edge-following operation in order to complete various tasks such as, for example, determining a location and/or orientation of a particular object, determining one or more dimensional attributes associated with the particular object, analyzing image data to detect one or more physical defects associated with an edge of the particular object, and/or the like.

"Edge-following operation" refers to one or more processes, actions, and/or computer-initiated commands executed by the components of the edge-following system (e.g., as carried out via software, hardware, or a combination of hardware and software based on computer-initiated commands) with reference to a particular object. For example, the edge-following computing device may execute one or more commands that cause the multi-axis robot of the edge-following system to engage and/or manipulate the particular object such that one or more processes may be performed on the edge of the particular object (e.g., one or more image data capturing processes).

In order to perform the one or more processes on the edge of the particular object, various measurements and/or computations may be executed during the edge-following operation to determine one or more dimensional attributes associated with the object. As used herein, the "dimensional attributes" refer to one or more external physical characteristics. The one or more dimensional attributes can include, but are not limited to, at least one of a length, a width, a depth, a corner location, a corner radius (e.g., radius of curvature), a center, an area, a position, an orientation, or any other external physical characteristics of the object. The dimensional attributes may be determined by direct measurement or indirect determination (e.g., via reading a make and model from a USB connection to the object or from a programmatic visual inspection of the image data comprising an image of the device) such as via an object localization vision model. Based in part on the dimensional attributes of the object, one or more reference points associated with the edge of the object can be determined in order to facilitate actions and/or manipulations of the object by, for example, the multi-axis robot and/or an ancillary tool. The one or more reference points associated with the edge of the object can be used in a motion-planning model related to the edge-following operation and can include, but are not limited to, a center-of-object, a starting point, a working point, and/or one or more points of rotation. In some embodiments, electronic data associated with the object, such as from a wired or wireless connection, may supply additional or alternative data configured to facilitate determining the one or more dimensional attributes (e.g., dimensional attributes stored in memory of the object, a make/model of the object from which dimensional attributes can be retrieved from a database, or the like).

The edge-following operation may comprise a motion-planning model. As used herein, a "motion-planning model" refers to an algorithmic, statistical, machine learning, and/or other model configured to be executed by hardware, software, or a combination of hardware and software configured to detect, determine, and/or execute the motion of one or more devices, objects, or other elements associated with the various systems and embodiments discussed herein. In various embodiments, a motion-planning model comprising one or more equations, functions, calculations, computer-coded instructions, and/or commands related to the manipulation of an object. The motion-planning model may be configured to determine the movement of the object (e.g., via determining computer-coded movement instructions for the multi-axis robot) and/or ancillary tool necessary to control the relative position and/or orientation between the object and the ancillary tool. The motion-planning model may comprise computer-coded instructions configured to determine one or more points of rotation and determine instructions to rotate the object and/or ancillary tool about the point(s) of rotation. The motion-planning model may further be configured to connect the rotational movement associated with two or more points of rotation with a translational movement associated with a linear side of the object.

By way of non-limiting example, using a predetermined or arbitrarily chosen starting point on the edge of the object, the path followed to keep the working point of the followed edge in the same point in space relative to the ancillary tool is determined by a motion-planning model that comprises finding new x and y points of the center of the object in space (e.g., on a particular coordinate plane) when rotating the object in order to execute to the one or more processes on the edge of the object (e.g., the one or more image data capturing processes). If the object has a rectangular shape, there would be four points of rotation associated with the object to be chained together with a translational motion along the edges of the object. As such, the edge-following system can identify four points of rotation and link the points of rotation by a translational motion perpendicular to the direction of the ancillary tool.

A primary requirement of the edge-following operation is that a working point on the edge of the object stays in the same point in space (e.g., a same point on the particular coordinate plane) for the duration of the edge-following operation while the edge moves perpendicularly past the ancillary tool (e.g., to create the relative impression of a flat, linear edge moving at a fixed distance and orientation relative to the ancillary tool in spite of the non-linear shape of the edge). To ensure the satisfaction of this primary requirement, various measurements, offsets, and/or orientations related to the object and/or the one or more components of the edge-following system may be determined. For example, as a result of the edge-following operation, one or more of a working offset and/or a working orientation may be determined to ensure the edge of the object stays in the same point in space throughout the duration of the edge-following operation.

"Center-of-object" refers to a center of an object being manipulated by a handling tool of the multi-axis robot. In various contexts, the center-of-object of the object can be used to determine an engagement point on the object (e.g., a point by which to grip the object) for the multi-axis robot. In some embodiments, the center-of-object may be determined via one or more processes, including geometric calculation based on one or more other attributes of the object, via a machine learning model, or the like.

"Working point" refers to a point on the edge of an object that an edge-following system is configured to target for work (e.g., via an ancillary tool such as an image capturing device). For example, a working point of an object may be the point at which an image capturing device is focused and which is disposed at the working offset from the image capturing device. The working point may move along an edge of the object during the edge-following operation such that the ancillary tool is configured to work along the edge or a portion thereof.

"Starting point" refers to a point on the edge of an object that represents an initial working point of an edge-following system. The starting point may be arbitrarily assigned, may be chosen based on one or more specific reference points, or may otherwise be defined at or prior to the start of an edge-following operation. In some embodiments in which an entire edge is to be worked on by the ancillary tool, the starting point may also be an end point.

"Point of rotation" refers to a point associated with an object that is derived, based at least in part, by a corner radius (e.g., radius of curvature) associated with the corners of the object. In various contexts, if an object has curved corners, the corner radius associated with the corners can be determined (e.g., as part of the edge-following operation) in order to derive the point of rotation of the object when the ancillary tool is working on the corner at issue. For example, as described herein, the corner radius of an object can be determined based on one or more dimensional attributes associated with the object. In some embodiments in which an object has four corners, four separate points of rotation may be defined for rotation around each at different points of the edge-following operation as part of a motion-planning model, which may link the four points of rotation with translational movement. In some embodiments, if an object has rectangular corners, the point of rotation may be defined on the corners themselves (e.g., radius of curvature is zero).

The point of rotation can be used during execution of the edge-following operation as a reference point about which the object may be rotated (e.g., the point of rotation may be kept stationary by the handling tool of the multi-axis robot) such that the working offset and/or the working orientation between (i) the working point as it varies along the edge of the object and (ii) the ancillary tool are maintained, and the working point associated with the edge of the object remains in a same point in space relative to the ancillary tool while the object and/or ancillary tool are being rotated. For an object with an edge comprising four corners, there are four respective points of rotation. Similarly, for an object with an edge comprising three corners, there are three respective points of rotation.

"Working offset" refers to a predetermined distance between the working point of the edge of the object and an ancillary tool (e.g., an image capturing device) working on the object. In various contexts where the ancillary tool is an image capturing device, the working offset can correspond to a predefined focal length of a lens associated with the image capturing device, which may facilitate high quality imaging of the working point.

"Working orientation" refers to an orientation of the working point of the object relative to an ancillary tool during execution of an edge-following operation. In order to maintain the working orientation and ensure that a working point associated with an edge of the object remains in a same point in space relative to the ancillary tool during the edge-following operation, the multi-axis robot supports the object (e.g., by way of the handling tool) such that the object remains at the same z-axis point while the object is rotated within an x-y plane and the working point is moved along the path of the edge (e.g., while being worked on by an ancillary tool), where the z-axis is perpendicular to the edge of the object.

As the object is rotated and/or translated (e.g., within an x-y plane intersecting the full edge of the object) the multi-axis robot may be configured to maintain the working offset to ensure consistent imaging of the edge from the same predetermined distance and/or the working orientation to ensure consistent imaging of the edge from the same angle. The imaging consistency may then facilitate the generation of a continuous image of the entire edge of the object while reducing artifacts and unnatural inconsistencies between various portions of the edge. This consistent working edge may thereby improve both the training data and the output from an anomaly detection model by providing better and more consistent data. Moreover, as discussed herein, generation of a single continuous image of the edge may add further robustness to the modeling process.

"Object" or "object of interest" refers to any three-dimensional object that can be manipulated by a handling tool of a multi-axis robot and worked upon by an ancillary tool associated with a particular edge-following system. The object comprises one edge comprising surfaces along a plurality of sides with corners connecting the sides. In various embodiments, an object can be a mobile device.

"Multi-axis robot" refers to any mechanical manipulation device capable of engaging an object of interest and manipulating the object by translating, rotating, and/or otherwise moving the object with respect to one or more axes. In some embodiments, the multi-axis robot may be configured to operably engage the object with a handling tool (e.g., via vacuum suction, jaws/grasping tool, adhesive, or the like) to facilitate the execution of an edge-following operation. In some embodiments, the multi-axis robot may be configured to temporarily and non-destructively engage the object. In various embodiments, the multi-axis robot may be a 6-axis robot configured as a robotic arm capable of being outfitted with various handling tools capable of manipulating an object (e.g., a FANUC LR Mate 200iD). The multi-axis robot may be inserted into a larger logistics process (e.g., as part of an enterprise-scale reverse-logistics system) whereby the edge-following system forms a portion of a larger workflow, and the multi-axis robot may be configured to retrieve the object from a first predetermined location and return the object to a second predetermined location in the logistics process, which locations may be the same or different. In various examples, the mechanical manipulation device is a gantry system or a turntable (i.e., a rotating surface).

"Handling tool" refers to an engagement tool that can be configured to manipulate one or more objects of interest. In some embodiments, the handling tool may be an integral part of the multi-axis robot (e.g., a distal end of a continuous robot arm) or may be separately attached and/or interchanged with one or more other handling tools (e.g., via a clamp assembly, such as a chuck). In some embodiments, the handling tool can be an end effector (e.g., a peripheral device) that can be mechanically coupled to the multi-axis robot and configured to manipulate one or more objects. In various contexts, the end effector can be a tool configured to operably engage the object (e.g., a vacuum tool, a grasping tool, an adhesive tool, or the like) and rotate and/or translate the object along one or more respective axes to facilitate the execution of an edge-following operation. When the end effector is configured as a grasping tool, the grasping tool may be configured to only contact two sides of the object, such as the front and back of the object.

The multi-axis robot, including the handling tool, may cooperate to move the object asymmetrically relative to the point of engagement between the multi-axis robot and the object. For example, a handling tool may engage a center of the object from the z-axis direction and may be configured to rotate about axes extending through one or more points of rotation parallel to the z-axis direction in addition to translating the object within the x-y plane. The multi-axis robot, including the handling tool, may comprise one or more linkages and motors, pistons, and/or the like for multi-axis movement of the object.

"Anomaly detection model" refers to an algorithmic, statistical, machine learning, and/or other model configured to be executed by hardware, software, or a combination of hardware and software configured to detect, calculate, extract, and/or otherwise determine particular data associated with a state of an object from image data. In various embodiments, the anomaly detection model can determine whether one or more physical defects exist on an edge of an object captured in a continuous image of the edge of the object. Non-limiting examples of an anomaly detection model include a trained convolutional neural network (CNN), a trained machine learning model, a trained artificial intelligence, and/or at least one image processing algorithm. In various embodiments, the anomaly detection model is trained using image data captured by one or more cameras associated with the edge-following system. Said image data can include, but is not limited to, image data related to one or more continuous images of one or more edges of one or more respective objects.

"Object localization vision model" refers to an algorithmic, statistical, machine learning, and/or other model configured to be executed by hardware, software, or a combination of hardware and software configured to detect, calculate, extract, and/or otherwise determine particular data from image data. In various embodiments, the object localization vision model can determine one or more dimensional attributes associated with an object. In some embodiments, the object localization vision model may be configured to directly measure the one or more dimensional attributes (e.g., using image data to determine a length, width, etc. of the object based on a predetermined reference length in the image data and/or calibration of the camera and platform locations to enable measurement of dimensions), to programmatically calculate one or more dimensional attributes (e.g., a surface area calculated from a length and a width), indirectly determine the one or more dimensional attributes (e.g., read, via image data and/or electronic transmission data from the object and/or a third-party computing device, data associated with the object, which data may include dimensional attributes or other data, such as make and model data, from which the dimensional attributes may be determined), or to otherwise gather or determine the one or more dimensional attributes. The object localization vision model may work in conjunction with the motion-planning model to facilitate engagement between the multi-axis robot and the object by helping to align and/or determine an engagement location on the object for the multi-axis robot.

Non-limiting examples of an object localization vision model include a trained neural network, a trained machine vision model, a trained machine learning model, a trained artificial intelligence, and/or at least one image processing algorithm. In various embodiments, the object localization vision model is trained using image data captured by one or more cameras associated with the edge-following system. Said image data can include, but is not limited to, image data related to one or more various types of objects such as, for example, one or more various types of mobile devices of different makes and/or models. In various embodiments, the image data is captured by an image capturing device placed over a platform that is supporting the mobile device (e.g., a conveyor belt). In some embodiments, the platform can be transparent and backlit by one or more lighting elements to allow imaging of a silhouette of the object. In embodiments in which the ancillary tool associated with the edge-following system is an image capturing device, the image capturing device employed to capture image data related to the silhouette of the object can be a different device than the ancillary tool.

"Ancillary tool" refers to a tool configured work on (e.g., perform one or more actions and/or processes in association with) an object. In some embodiments, the ancillary tool may be configured to work on (e.g., image) an edge of a particular object being manipulated by the handling tool of a multi-axis robot during execution of an edge-following operation. In various embodiments, the ancillary tool may be an image capturing device configured to capture image data related to the object (e.g., the edge of the object). In various other embodiments, the ancillary tool may be a cutting tool, a welding tool, a drilling tool, a brushing tool, a fluid dispensing tool, a spray tool a circulating tool, and/or the like. During an edge-following operation, the ancillary tool may be maintained, either passively via rigid coupling to a fixed surface or actively via a robot or other device, at a predetermined working offset and/or working orientation relative to the object. In various contexts, the working orientation of the ancillary tool relative to the working point of the object may comprise positioning the ancillary tool perpendicularly to the working point of the edge of the object during execution of the edge-following operation. In various contexts, the ancillary tool can be automatically or manually controlled via the edge-following computing device of the edge-following system (e.g., via a network associated with the edge-following system). In various embodiments, the edge-following system, including the multi-axis robot and/or ancillary tool may be adapted for other continuous image generation functions in addition to edge-following (e.g., various path following operations in 3D space).

"Image capturing device" refers to a device configured to capture one or more portions of image data, including image data related to, but not limited to, an edge of an object. An image capturing device may include a camera (e.g., a photographic camera, a LIDAR camera, or any other device capable of imaging the object for one or more of the respective functions described herein). In various contexts, the image capturing device can capture one or more types of image data including, but not limited to, one or more still photos, one or more bursts photos, and/or one or more videos that can be directly or indirectly used to make a continuous image of the edge of the object. In some embodiments, an imaging device that is used for determining one or more dimensional attributes may comprise a different camera technology or the same camera technology (or may be the same camera) than an imaging device configured to capture image data related to the edge of the object.

"Continuous image" refers to a programmatically generated image comprising multiple combined portions of image data (e.g., a composite image comprising multiple images or portions of images). In various embodiments of the present disclosure, the continuous image represents at least a portion of one or more surfaces of an object. In some embodiments, the continuous image may represent a three-dimensional object as a two-dimensional image by compositing images captured from multiple surfaces (e.g., multiple sides and/or corners) of an object in a single linear image. In combination with maintaining the working offset and/or working orientation, the resulting continuous image may appear to be a single image of some or all of the edge of the object. The continuous image of the edge of the object may be a composite image made up of a plurality of still photos and/or video data captured of the edge of the object as the object is manipulated (e.g., rotated and/or translated) by the multi-axis robot. As such, the continuous image of the edge of the object comprises data related to the plurality of sides and corners associated with the edge of the object. In various embodiments, the image capturing device can be outfitted with a telecentric lens and configured such that an image sensor associated with the image capturing device is active while the object is manipulated by the multi-axis robot such that the images captured by the image capturing device are stitched together to make a single, continuous image of the edge of the object including one or more corners and one or more sides of the object.

As used herein, the terms "data," "content," "digital content," "digital content object," "information," and similar terms may be used interchangeably to refer to data capable of being transmitted, received, created, modified, and/or stored in accordance with examples of the present disclosure. Thus, use of any such terms should not be taken to limit the spirit and scope of examples of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like (sometimes referred to herein as a "network"). Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "circuitry" should be understood broadly to include hardware and, in some examples, software for configuring the hardware. With respect to components of the apparatus, the term "circuitry" as used herein should therefore be understood to include particular hardware configured to perform the functions associated with the particular circuitry as described herein. For example, in some examples, "circuitry" may include processing circuitry, storage media, network interfaces, input/output devices, and the like.

"Executable code", "computer-coded instructions", and the like refer interchangeably to one or more portions of computer program code storable and/or stored in one or a plurality of locations that is executed and/or executable via one or more computing devices embodied in hardware, software, firmware, and/or any combination thereof. Executable code may define at least one particular operation to be executed by one or more computing devices. In some embodiments, a memory, storage, and/or other computing device includes and/or otherwise is structured to define any amount of executable code (e.g., a portion of executable code associated with a first operation and a portion of executable code associated with a second operation). Alternatively or additionally, in some embodiments, executable code is embodied by separate computing devices (e.g., a first data store embodying first portion of executable code and a second data store embodying a second portion executable code). In some embodiments, executable code requires one or more processing steps (e.g., compilation) prior to being executed by a computing device.

"Data store", "storage", "memory", and the like refer interchangeably to any type of non-transitory computer-readable storage medium. Non-limiting examples of a data store include hardware, software, firmware, and/or a combination thereof capable of storing, recording, updating, retrieving and/or deleting computer-readable data and information, whether embodied locally and/or remotely and whether embodied by a single hardware device and/or a plurality of hardware devices.

"Data attribute" refers to electronically managed data representing a variable, a particular criteria, or a property having a particular value or status. The value may be statically fixed or dynamically assigned. In some embodiments, a data attribute embodies a particular property of a data object.

"Data value" refers to electronically managed data representing a particular value associated with a particular data attribute.

"Data object" refers to an electronically managed data structure representing a collection of one or more data attributes and/or portions of executable code The term "computing device" refers to any computer, processor, circuitry, and/or other executor of computer instructions that is embodied in hardware, software, firmware, and/or any combination thereof. A computing device may enable access to a myriad of functionalities associated with one or more mobile device(s), other computing devices, system(s), and/or one or more communications networks. Non-limiting examples of a computing device include a computer, a processor, an application-specific integrated circuit, a field-programmable gate array, a personal computer, a smart phone, a laptop, a fixed terminal, a server, a networking device, and a virtual machine.

The term "mobile device" refers to any portable computing device, such as, but not limited to, a portable digital assistant (PDA), mobile telephone, smartphone, or tablet computer with one or more communications, networking, and/or interfacing capabilities. Non-limiting examples of communications, networking, and/or interfacing capabilities include CDMA, TDMA, 4G, 5G, NFC, Wi-Fi, Bluetooth, as well as hard-wired connection interfaces such as USB, Thunderbolt, and/or ethernet connections.

Example Systems and Apparatuses of the Disclosure

FIG. 1 is a diagram of an exemplary environment 100 configured for following at least a portion of an edge of an object 108 in accordance with one or more embodiments of the present disclosure. The exemplary environment 100 includes an edge-following system 102 capable of automatically engaging and manipulating an object 108 as part of an edge-following operation associated with an edge of the object 108. As described herein, the various components of the edge-following system 102 are configured to execute an edge-following operation to cause and/or facilitate the relative movement of the object 108 and the one or more ancillary tool(s) 110 in a manner configured to keep a working offset 122 between a working point on the surface of the object 108 and the one or more ancillary tool(s) 110. The working point may be moved along the surface of the object 108 to facilitate consistent working, via the working offset 122, while also performing the work along a length of the surface of the object 108 (e.g., some or all of the edge of the object 108). A non-limiting example of the type of work the edge-following system 102 may facilitate is the capture of one or more portions of image data related to the surface of the edge of the object 108 and the subsequent generation of a continuous image of the surface of the edge of the object 108 based on the captured image data. Another non-limiting example of the type of work the edge-following system 102 may facilitate is polishing or buffing of the object. For example, the edge-following system 102 may facilitate a polishing or buffing head to apply a constant force or pressure on an edge of the object, including curved surfaces of the object.

As will be discussed further, the continuous image of the object 108 may be used to detect one or more physical defects associated with the edge of the object. In another non-limiting example, the continuous image of the object may be used to inspect results of various manufacturing processes, such as a weld joint, a thermal bonding joint, a seam incorporated with a sewing process, etc.

As described herein, in some embodiments, the ancillary tool(s) 110 may include a camera configured to image the surface of the object 108 (e.g., the edge of the mobile device). The camera may image the surface as the object 108 is manipulated by the multi-axis robot 104 to move the working point along the surface of the object 108 while maintaining the working offset 122 between the camera and the object 108. The working offset 122 may be configured to generate consistent image data despite the relative movement between the object 108 and the camera, such that the camera image data may be composited into a continuous image comprising the entire imaged surface of the object 108 or a portion thereof taken from a consistent offset.

In some embodiments, maintaining a working orientation and a working offset 122 between the working point on the surface of the object 108 and the cameras may facilitate the generation of a continuous image, which may appear to be a single flat image comprising the entire surface imaged (e.g., the surface of an edge of the object 108), even when such surfaces include corners and other non-flat portions. In some embodiments, the multi-axis robot 104 may instead manipulate the camera while the object 108 remains stationary without departing from the scope of the present disclosure. In various embodiments, one or more continuous images related to the edge of the object 108 can be used to automatically determine and/or diagnose the condition of an edge of the object 108, such as by detecting one or more physical defects associated with the edge of the object 108 using an anomaly detection model associated with the edge-following system 102.

The edge-following system 102 may include one or more multi-axis robots 104, one or more ancillary tools 110, one or more edge-following computing devices 112, one or more image capturing devices, one or more datastores 114, a network 116, and/or a camera 124 configured to facilitate the execution of the various functions described herein. In one or more embodiments, an object 108 may be a mobile device such as, but not limited to, smartphone, another type of mobile telephone, a laptop, a portable digital assistant (PDA), a tablet computer, or the like with one or more communications, networking, and/or interfacing capabilities.

The multi-axis robot 104 may be any mechanical manipulation device capable of engaging an object and manipulating the object by translating, rotating, and/or otherwise moving the object with respect to one or more axes and/or moving the ancillary tool according to some embodiments. In some embodiments, the multi-axis robot may be configured to operably engage the object 108 with a handling tool 106 (e.g., via vacuum suction, jaws, adhesive, or the like) to facilitate the execution of an edge-following operation. Various portions of the multi-axis robot 104, including the handling tool 106 in some instances, may define the various degrees of freedom of the object. For example, the multi-axis robot may have any number of articulating joints (e.g., as shown in FIG. 1) or equivalent structures configured to translate and/or rotate the object in any direction. In some embodiments, the multi-axis robot 104 may be configured to temporarily and non-destructively engage the object 108. In various embodiments, the multi-axis robot 104 may be a 6-axis robot configured as a robotic arm capable of being outfitted with various handling tools 106 capable of manipulating an object (e.g., a FANUC LR Mate 200iD). In some embodiments, the multi-axis robot 104 may be configured to move the object in up to six degrees of freedom. The multi-axis robot 104 may be inserted into a larger logistics process (e.g., as part of an enterprise-scale reverse-logistics system) whereby the edge-following system 102 forms a portion of a larger workflow, and the multi-axis robot 104 may be configured to retrieve the object 108 from a first predetermined location (e.g., a platform 118) and return the object 108 to a second predetermined location in the logistics process, which locations may be the same or different.

The handling tool 106 associated with the multi-axis robot 104 may be an engagement tool that can be configured to manipulate an object 108. In some embodiments, the handling tool 106 may be an integral part of the multi-axis robot 104 (e.g., a distal end of a continuous robot arm) or may be separately attached and/or interchanged with one or more other handling tools 106 (e.g., via a clamp assembly, such as a chuck). In some embodiments, the handling tool 106 can be an end effector (e.g., a peripheral device) that can be mechanically coupled to the multi-axis robot 104 and configured to manipulate one or more objects 108. In various contexts, the end effector can be a tool configured to operably engage the object 108 (e.g., a vacuum tool, a grasping tool, an adhesive tool, or the like) and rotate and/or translate the object 108 along one or more respective axes to facilitate the execution of an edge-following operation.

The multi-axis robot 104, including the handling tool 106, may cooperate to move the object 108 asymmetrically relative to the point of engagement between the multi-axis robot 104 and the object 108. For example, a handling tool 106 may engage a center of the object 108 from the z-axis direction and may be configured to rotate about axes extending through one or more points of rotation parallel to the z-axis direction in addition to translating the object 108 within the x-y plane. The multi-axis robot 104, including the handling tool 106, may comprise one or more linkages and motors, pistons, and/or the like for multi-axis movement of the object 108.

The multi-axis robot 104 is configured to support and/or manipulate the object 108 while keeping a working point associated with the edge of the object 108 at a predetermined working orientation and/or working offset relative to an ancillary tool 110 during execution of an edge-following operation. In order to maintain the working orientation and/or working offset and ensure that a working point associated with an edge of the object 108 remains in a same point in space relative to the ancillary tool 110 during the edge-following operation, the multi-axis robot 104 supports the object (e.g., by way of the handling tool 106) such that the object 108 remains at the same z-axis point while the object 108 is rotated within an x-y plane and the working point is moved along the path of the edge (e.g., while being worked on by an ancillary tool 110), where the z-axis is perpendicular to the x-y plane that intersects the entire edge of the object 108.

It will be understood that the various dimensions, axes, and/or relationships of the various components of the edge-following system 102 may be relative to one another and, as such, the working offset(s), working orientation(s), and/or the position(s) of the various components of the edge-following system 102 do not require an absolute orientation and/or configuration relative to the earth. For example, the one or more x-, y-, and/or z-axes related to the object 108 may be an arbitrary frame of reference related to the orientation, position, and/or configuration of the multi-axis robot 104, the handling tool 106 associated with the multi-axis robot 104, and/or the ancillary tool 110 relative to the object 108.

As the object 108 is rotated and/or translated (e.g., within an x-y plane intersecting the full edge of the object 108) the multi-axis robot 104 may be configured to maintain the working offset 122 to ensure consistent imaging of the edge from the same predetermined distance and/or the working orientation to ensure consistent imaging of the edge from the same angle. The imaging consistency may then facilitate the generation of a continuous image of the entire edge of the object or a selected portion thereof while reducing artifacts and unnatural inconsistencies between various portions of the edge. In some embodiments, the edge-following process may begin at a predetermined starting point to cause the continuous image to begin and end at the same position for each image. This consistent working edge may thereby improve both the training data and the output from an anomaly detection model by providing better and more consistent data and ensuring the models are trained and executed using the most consistent conditions as possible. Moreover, as discussed herein, generation of a single continuous image of the edge may add further robustness to the modeling process.

In various contexts, the multi-axis robot 104 may engage the object 108 (e.g., pick up the object 108, such as by suction) from a platform 118. As described herein, in some embodiments, the edge-following system 102 can identify, receive, retrieve, measure, and/or otherwise determine one or more dimensional attributes associated with a respective object 108. For example, the edge-following system 102 may employ an object localization vision model to determine the one or more dimensional attributes associated with a respective object 108. For this purpose, one or more cameras (e.g., camera 124) associated with the edge-following system 102 can be oriented above a platform 118 supporting the respective object 108. In some embodiments, the platform 118 can be a motorized conveyor belt that is transparent and backlit by one or more lighting elements 120 to allow imaging of a silhouette of the object 108, as depicted in FIGS. 9-13. Based on the image data related to the silhouette of the object 108, the object localization vision model can determine the one or more dimensional attributes associated with the respective object 108. For example, based on the image data related to the silhouette of the object 108, the object localization vision model may determine a periphery of the object, as depicted in FIG. 9. The object localization vision model may determine a center of the object 108, as depicted in FIG. 10. The object localization vision model may determine the location, orientation, and length of each of the edges and the width and the height of the object 108, as depicted in FIG. 11. The object localization vision model may determine the orientation of the phone relative to the platform 118, as depicted in FIG. 12 (e.g., the angle of "LINE 8" relative to the edge of the platform 118 may be measured). The object localization vision model may determine a radius of a corner arc of the object 108, as depicted in FIG. 13. The one or more dimensional attributes can include, but are not limited to, at least one of a length, a width, a depth, a corner location, a corner radius (e.g., radius of curvature), a center, an area, a position, an orientation, a periphery, an edge, an angle relative to the platform 118, or any other external physical characteristics of the object.

In some embodiments, the object localization vision model may be configured to directly measure the one or more dimensional attributes (e.g., using image data to determine a length, width, etc. of the object), to programmatically calculate one or more dimensional attributes (e.g., a surface area calculated from a length and a width), indirectly determine the one or more dimensional attributes (e.g., read, via image data and/or electronic transmission data from the object, data associated with the object 108, which data may include dimensional attributes or other data, such as make and model data, from which the dimensional attributes may be determined), or to otherwise gather or determine the one or more dimensional attributes. The object localization vision model may work in conjunction with the motion-planning model to facilitate engagement between the multi-axis robot 104 and the object by helping to align and/or determine an engagement location on the object for the multi-axis robot 104.

In various embodiments, the dimensional attributes may be determined by direct measurement or indirect determination (e.g., via reading a make and model from a USB connection to the object 108 or from a programmatic visual inspection of the image data comprising an image of the object 108) such as via the object localization vision model. Based in part on the dimensional attributes of the object 108, one or more reference points associated with the edge of the object 108 can be determined in order to facilitate actions and/or manipulations of the object 108 by, for example, the multi-axis robot 104 and/or an ancillary tool 110. The one or more reference points associated with the edge of the object 108 can be used in a motion-planning model related to the edge-following operation and can include, but are not limited to, a center-of-object, a starting point, a working point, and/or one or more points of rotation. In some embodiments, electronic data associated with the object 108, such as from a wired or wireless connection, may supply additional or alternative data configured to facilitate determining the one or more dimensional attributes (e.g., dimensional attributes stored in memory of the object 108, a make/model of the object 108 from which dimensional attributes can be retrieved from a database, or the like). In some embodiments, the reference points may be used with known locations (e.g., via calibration) of the various system components to plan the motion and steps of the edge-following operation. For example, the camera 124 may generate image data that is processed to identify the center of the object 108, which, along with the dimensions of the object, may be used in the motion planning algorithm without requiring further sensing or localization steps. In some embodiments, further sensors are used, but are not required to be used, to confirm a location of the object 108.

The edge-following system 102 also comprises an ancillary tool 110 configured to work on (e.g., perform one or more actions and/or processes on) an edge of a particular object 108 being manipulated by the handling tool 106 of a multi-axis robot 104 during execution of an edge-following operation. In various embodiments, the ancillary tool 110 may be an image capturing device configured to capture image data related to the edge of the object 108. In such embodiments, the image capturing device can capture one or more types of image data including, but not limited to, one or more still photos, one or more bursts photos, and/or one or more videos that can be directly or indirectly used to make a continuous image of the edge of an object 108. The continuous image of the edge of the object 108 can be a composite image made up of a plurality of still photos and/or video data captured of the edge of the object 108 as the object 108 is manipulated (e.g., rotated) by the multi-axis robot 104. As such, the continuous image of the edge of the object 108 comprises data related to the plurality of sides and corners associated with the edge of the object 108. In various embodiments, the image capturing device can be outfitted with a telecentric lens and configured such that an image sensor associated with the image capturing device is active while the object 108 is manipulated by the multi-axis robot 104 such that the images captured by the image capturing device are stitched together to make a single, continuous image of the edge of the object 108.

In various other embodiments, the ancillary tool 110 may be a cutting tool, a welding tool, a drilling tool, a brushing tool, a fluid dispensing tool, a spray tool a circulating tool, and/or the like. During an edge-following operation, the ancillary tool 110 is continuously maintained at a predetermined working offset 122 from the object. The working offset 122 may be a predetermined distance between an edge of an object 108 and an ancillary tool 110 working on the edge of the object 108. In various contexts where the ancillary tool 110 is an image capturing device, the working offset 122 can correspond to a predefined focal length of a lens associated with the image capturing device. In various contexts, the ancillary tool 110 is positioned perpendicularly to the edge of the object 108 during execution of the edge-following operation (e.g., an example working orientation). In various contexts, the ancillary tool 110 can be automatically or manually controlled via the edge-following computing device 112 of the edge-following system 102 (e.g., via a network 116 associated with the edge-following system 102).

In various embodiments, one or more multi-axis robots 104 may be configured to manipulate the ancillary tool 110 in addition to, or instead of, manipulating the object 108 (e.g., via the handling tool 106) such that (i) both the ancillary tool 110 and the object 108 may be moving relative to the earth, (ii) only the object 108 may be moving relative to the earth, or (iii) only the ancillary tool 110 may be moving relative to the earth.

The depicted embodiment of the edge-following system 102 comprises an edge-following computing device 112 (described herein below and in FIG. 2 in greater detail, also referred to as just "computing device") configured to transmit signals and execute various portions of executable code related to performing an edge-following operation with respect to a particular object 108. For example, the edge-following computing device 112 can execute various operations related to a motion-planning model associated with an edge-following operation performed by the edge-following system 102 with respect to a particular object 108. The motion-planning model may be configured to detect, determine, and/or execute the motion of one or more devices, objects 108, or other elements associated with the various systems and embodiments discussed herein. The motion-planning model may be configured to determine the movement of the object 108 (e.g., via determining computer-coded movement instructions for the multi-axis robot 104) and/or ancillary tool 110 necessary to control the relative position and/or orientation between the object 108 and the ancillary tool 110. In this regard, the motion-planning model may comprise computer-coded instructions configured to determine one or more points of rotation and/or determine instructions to rotate the object 108 and/or ancillary tool 110 about the point(s) of rotation. The motion-planning model may further be configured to connect the rotational movement associated with two or more points of rotation with a translational movement associated with a linear side of the object 108.

Furthermore, the edge-following computing device 112 may be configured to execute one or more operations related to an anomaly detection model and/or an object localization vison model associated with the edge-following system 102. As described herein, the anomaly detection model may be configured to detect, calculate, extract, and/or otherwise determine particular data associated with a state of an object 108 from image data. In various embodiments, the anomaly detection model can determine whether one or more physical defects exist on an edge of an object 108 captured in a continuous image of the edge of the object 108. Non-limiting examples of an anomaly detection model include a trained convolutional neural network (CNN), a trained machine learning model, a trained artificial intelligence, and/or at least one image processing algorithm. In various embodiments, the anomaly detection model is trained using image data captured by one or more cameras associated with the edge-following system 102. Said image data can include, but is not limited to, image data related to one or more continuous images of one or more edges of one or more respective objects 108. The anomalies (e.g., defects) on the image within the continuous images may be labeled and used as a training set to train the anomaly detection model. Additional non-limiting examples of an anomaly detection model include classical machine vision.

In various embodiments, the edge-following computing device 112 may be configured to programmatically generate a continuous image related to the edge of an object 108. The continuous image may comprise multiple combined portions of image data (e.g., a composite image comprising multiple images or portions of images). In various embodiments, the continuous image represents at least a portion of one or more surfaces of an object 108. In some embodiments, the continuous image may represent a three-dimensional object as a two-dimensional image by compositing images captured from multiple surfaces (e.g., multiple sides and/or corners) of an object in a single linear image. In combination with maintaining the working offset and/or working orientation, the resulting continuous image may appear to be a single image of some or all of the edge of the object. In some embodiments, the object edge may have an edge that curves in the z-y and/or z-x planes (e.g., perpendicular to the direction of travel of the working point), which may be visualized as depth on the continuous image.

The continuous image of the edge of the object 108 may be a composite image made up of a plurality of still photos and/or video data captured of the edge of the object 108 by an image capturing device as the object 108 is manipulated (e.g., rotated and/or translated) by the multi-axis robot 104. As such, the continuous image of the edge of the object 108 comprises data related to the plurality of sides and corners associated with the edge of the object 108. In various embodiments, the image capturing device can be outfitted with a telecentric lens and configured such that an image sensor associated with the image capturing device is active while the object 108 is manipulated by the multi-axis robot 104 such that the images captured by the image capturing device are stitched together to make a single, continuous image of the edge of the object 108, including one or more corners and one or more sides of the object.

Additionally, in various embodiments, the edge-following computing device 112, in conjunction with one or more image capturing devices associated with the edge-following system 102, is configured to provide feedback (e.g., whether such feedback is constant, intermittent, triggered, or the like) related to a current edge-following operation being executed with respect to a particular object 108. In this regard, the edge-following computing device 112 may be configured to communicate with one or more image capturing devices to capture and process image data related to the object 108 throughout the entire respective edge-following operation process related to the object 108 or portions thereof.

The depicted edge-following system 102 also comprises a datastore 114 used in accordance with various embodiments of the present disclosure. The datastore 114 can be any configuration of non-transitory computer-readable storage medium. Non-limiting examples of a datastore include hardware, software, firmware, and/or a combination thereof capable of storing, recording, updating, retrieving and/or deleting computer-readable data and information. For example, the datastore 114 can contain one or more computer program command sequences to be executed by the edge-following computing device 112 on the object 108 in order to follow the edge of the object 108. In some embodiments, the memory incorporated with the edge-following computing device 112 (e.g., memory 204) comprises the one or more computer program command sequences to be executed by the edge-following computing device 112. In some embodiments, the datastore 114 and the edge-following computing device 112 are part of the same computing device. In some embodiments, the datastore 114 and the edge-following computing device 112 are distinct devices connected via wired or wireless connection, or a combination thereof, including via one or more networks. Additionally or alternatively, the datastore 114 may be used to store, update, and maintain the image data captured by an image capturing device associated with the edge-following system 102 and/or any continuous images generated based on image data related to an edge of a respective object 108.

In various embodiments, the edge-following computing device 112 can direct the datastore 114 to retrieve and/or transmit data via the network 116. For instance, the edge-following computing device 112 can direct the datastore 114 to transmit image data captured by the image capturing devices via the network 116 to a second reverse-logistics depot associated with an enterprise employing the edge-following system 102 such that the second reverse-logistics depot can train a second anomaly detection model. In some embodiments, the edge-following computing device 112 may comprise a single or multiple computing devices, either locally instantiated at the reverse-logistics depot or remotely in the cloud or in one or more other locations.

In some embodiments, the datastore 114 may house some or all of the motion-planning model associated with an edge-following operation, anomaly detection model, and/or object localization vision model for retrieval by the edge-following computing device 112. In various embodiments, any data and/or executable code used in or useful for any of the embodiments discussed herein may be stored on the datastore 114. Hardware suitable for use as part of a datastore include all forms of non-volatile memory, media and memory devices, including by way of example, and without limitation, semiconductor memory devices, e.g., EPROM, EEPROM, and flash memory devices; magnetic disks, e.g., internal hard disks or removable disks; magneto-optical disks; and CD-ROM and DVD-ROM disks.

In various embodiments, the network 116 integrated with the edge-following system 102 is any suitable network or combination of networks and supports any appropriate protocol suitable for communication of data to and from components of the edge-following system 102. In some embodiments, the network 116 may connect the components of the edge-following system 102 with one or more external computing devices, including, but not limited to, one or more mobile devices. According to various embodiments, the network 116 may include a public network (e.g., the Internet), a private network (e.g., a network within an organization), or a combination of public and/or private networks. According to various embodiments, the network 116 is configured to provide communication between various components depicted in FIG. 1 (e.g., edge-following computing device 112 and/or datastore 114). According to various embodiments, network 116 can comprise one or more networks that connect devices and/or components in the network layout to allow communication between the devices and/or components. For example, the network 116 can be implemented as the Internet, a wireless network, a wired network (e.g., Ethernet), a local area network (LAN), a Wide Area Network (WANs), Bluetooth, Near Field Communication (NFC), Worldwide Interoperability for Microwave Access (WiMAX) network, a personal area network (PAN), a short-range wireless network (e.g., a Bluetooth® network), an infrared wireless (e.g., IrDA) network, an ultra-wideband (UWB) network, an induction wireless transmission network, and/or any other type of network that provides communications between one or more components of the network layout. In some embodiments, network 116 is implemented using cellular networks, satellite, licensed radio, or a combination of cellular, satellite, licensed radio, and/or unlicensed radio networks. In one or more embodiments, the communications circuitry 206 comprised in the edge-following computing device 112 can transmit and receive data to and from the edge-following system 102 via the network 116.

Figure 2:
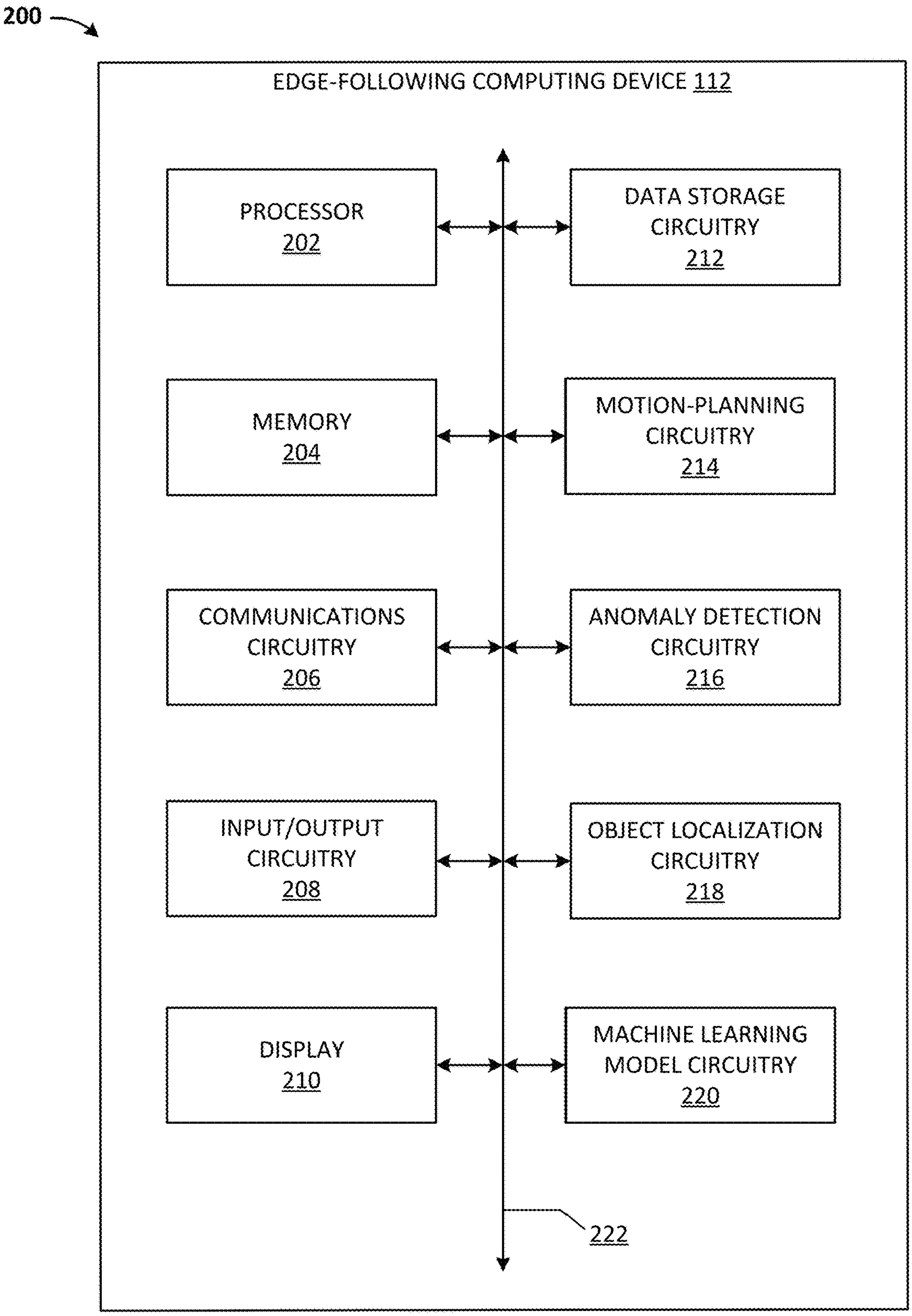
FIG. 2 is a block diagram of an exemplary edge-following computing device structured in accordance with one or more embodiments of the present disclosure.

FIG. 2 illustrates a block diagram 200 of an example apparatus according to one or more described features of one or more embodiments of the disclosure. The block diagram 200 may represent an edge-following computing device 112 configured to facilitate executing an edge-following operation with respect to a particular object 108 in accordance with at least some example embodiments of the present disclosure. The edge-following computing device 112 may include a processor 202, a memory 204, communications circuitry 206, input/output circuitry 208, display 210, data storage circuitry 212, motion-planning circuitry 214, anomaly detection circuitry 216, object localization circuitry 218, and/or machine learning model circuitry 220 that are in electronic communication with one another via a system bus 222. In some embodiments, system bus 222 refers to a computer bus that connects these components so as to enable data transfer and communications between these components. Additionally, or alternatively, the edge-following computing device 112 may be in other form(s) and/or may comprise other component(s).

In general, the terms computing device, system, entity, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the edge-following computing device 112 embodies a particular, specially configured computing system transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. In some embodiments, other elements of the edge-following computing device 112 provide or supplement the functionality of another particular set of circuitry. For example, the processor 202 in some embodiments provides processing functionality to any of the sets of circuitry, the memory 204 provides storage functionality to any of the sets of circuitry, the communications circuitry 206 provides network interface functionality to any of the sets of circuitry, and/or the like.

The processor 202 may be embodied in a number of different ways and may, for example, include one or more processing devices configured to perform independently. Additionally, or alternatively, the processor 202 may include one or more processors configured in tandem via a bus to enable independent execution of instructions, pipelining, and/or multithreading. Additionally, in some embodiments, the processor 202 may include one or processors, some which may be referred to as sub-processors, to control one or more components, modules, or circuitry of edge-following computing device 112.

The processor 202 may be embodied as one or more complex programmable logic devices (CPLDs), microprocessors, multi-core processors, co-processing entities, application-specific instruction-set processors (ASIPs), and/or controllers. Further, the processor 202 may be embodied as one or more other processing devices or circuitry. The term circuitry may refer to a hardware embodiment or a combination of hardware and computer program products. Thus, the processor 202 may be embodied as integrated circuits, application specific integrated circuits (ASICs), field programmable gate arrays (FPGAs), programmable logic arrays (PLAs), hardware accelerators, another circuitry, and/or the like. As will therefore be understood, the processor 202 may be configured for a particular use or configured to execute instructions stored in volatile or non-volatile media or otherwise accessible to the processor 202. As such, whether configured by hardware or computer program products, or by a combination thereof, the processor 202 may be capable of performing steps or operations according to embodiments of the present disclosure when configured accordingly.

In an example embodiment, the processor 202 may be configured to execute instructions stored in the memory 204 or otherwise accessible to the processor. Alternatively, or additionally, the processor 202 may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor to perform the algorithms and/or operations described herein when the instructions are executed.

In some embodiments, the memory 204 may be non-transitory and may include, for example, one or more volatile and/or non-volatile memories. In other words, for example, the memory 204 may be an electronic storage device (e.g., a computer readable storage medium). The memory 204 may be configured to store information, data, content, applications, instructions, or the like, for enabling the edge-following computing device 112 to carry out various functions in accordance with example embodiments of the present disclosure. In this regard, the memory 204 may be preconfigured to include computer-coded instructions (e.g., computer program code), and/or dynamically be configured to store such computer-coded instructions for execution by the processor 202.

In an example embodiment, the edge-following computing device 112 further includes a communications circuitry 206 that may enable the edge-following computing device 112 to transmit data and/or information to other devices or systems through a network (such as, but not limited to, the multi-axis robot 104 and the datastore 114 as shown in FIG. 1). The communications circuitry 206 may be any means such as a device or circuitry embodied in either hardware or a combination of hardware and software that is configured to receive and/or transmit data from/to a network and/or any other device, circuitry, or module in communication with the edge-following computing device 112. In this regard, the communications circuitry 206 may include, for example, a network interface for enabling communications with a wired or wireless communication network. For example, the communications circuitry 206 may include one or more circuitries, network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

In some embodiments, the edge-following computing device 112 includes input/output circuitry 208 that may, in turn, be in communication with the processor 202 to provide output to the user and, in some embodiments, to receive an indication of a user input. The input/output circuitry 208 may comprise an interface or the like. In some embodiments, the input/output circuitry 208 may include a keyboard, a mouse, a joystick, a touch screen, touch areas, soft keys, a microphone, a speaker, or other input/output mechanisms. The processor 202 and/or input/output circuitry 208 may be configured to control one or more functions of one or more user interface elements through computer program instructions (e.g., software and/or firmware) stored on a memory accessible to the processor (e.g., memory 204). The processor 202 and/or input/output circuitry 208 may also be configured to control one or more image capturing devices integrated by the edge-following system 102.

In some embodiments, the edge-following computing device 112 includes the display 210 that may, in turn, be in communication with the processor 202 to display user interfaces (such as, but not limited to, display of a call and/or an application). In some embodiments of the present disclosure, the display 210 may include a liquid crystal display (LCD), a light-emitting diode (LED) display, a plasma (PDP) display, a quantum dot (QLED) display, and/or the like.

In some embodiments, the edge-following computing device 112 includes the data storage circuitry 212 which comprises hardware, software, firmware, and/or a combination thereof, that supports functionality for generating, storing, and/or maintaining one or more data objects associated with the edge-following system 102. For example, in some embodiments, the data storage circuitry 212 includes hardware, software, firmware, and/or a combination thereof, that stores data related to image data captured by an image capturing device in the datastore 114. Additionally or alternatively, the data storage circuitry 212 also stores and maintains data related to one or more edge-following operations in the datastore 114. Additionally or alternatively still, the data storage circuitry 212 also stores and maintains training data for an anomaly detection model and/or an object localization vision model associated with the edge-following system 102 in the datastore 114. In some embodiments, the data storage circuitry 212 can be integrated with, or embodied by, the datastore 114. In some embodiments, the data storage circuitry 212 includes a separate processor, specially configured field programmable gate array (FPGA), or a specially programmed application specific integrated circuit (ASIC).

In some embodiments, the edge-following computing device 112 includes motion-planning circuitry 214 which comprises hardware, software, firmware, and/or a combination thereof, that supports functionality for following an edge of a respective object 108. In one or more embodiments, the motion-planning circuitry 214 works in conjunction with the processor 202 and one or more components of the edge-following computing device 112 to cause execution of an edge-following operation with respect to the edge of the object 108. For example, the motion-planning circuitry 214 in conjunction with the processor 202 and/or the communications circuitry 206 can transmit, to the multi-axis robot 104, signals configured to cause manipulation of the object 108. The signals configured to cause manipulation of the object 108 can be generated by the motion-planning circuitry 214 based on a motion-planning model generated for a particular object 108 based on one or more dimensional attributes associated with the object 108.

In this regard, the motion-planning circuitry 214 can execute one or more operations related to generating and/or executing motion-planning model related to a particular edge-following operation. For example, the motion-planning circuitry 214 can initiate one or more variables related to one or more functions, equations, methods, and/or the like related to the motion-planning model of a particular edge-following operation. Additionally, the motion-planning circuitry 214 can generate, initialize, and/or determine one or more position registers associated with the object 108 during the execution of the motion-planning model related to a respective edge-following operation. Furthermore, the motion-planning circuitry 214 can generate, initialize, and/or determine one or more of a working offset, working orientation, and/or one or more reference points (e.g., starting points, working points, and/or points of rotation) for an object 108 associated with a particular edge-following operation.

In some embodiments, the edge-following computing device 112 includes anomaly detection circuitry 216 which comprises hardware, software, firmware, and/or a combination thereof, that supports functionality for capturing image data related to an edge of a respective object 108 and determining from captured image data whether there are one or more physical defects associated with the edge of the respective object 108. In this regard, the anomaly detection circuitry 216 can direct one or more image capturing devices to capture image data related to an edge of a respective object 108. For example, in some embodiments, the anomaly detection circuitry 216 can direct one or more image capturing devices to capture image data related to the edge of the object in order to generate a continuous image of the edge of the object. The anomaly detection circuitry 216 can compare the continuous image to other previously collected image data stored in the datastore 114 via an anomaly detection model according to any of the various embodiments discussed herein. In some embodiments, the anomaly detection circuitry 216 can execute one or more pre-processing steps on the image data to facilitate input into the anomaly detection model. Additionally or alternatively, the anomaly detection circuitry 216 can apply one or more filters to the image data including, but not limited to, a gaussian blur filter, an inversion filter, color corrections such as a grayscale conversion filter, and/or one or more linear filters. In some embodiments, applying the one or more filters may enable higher accuracy of anomaly detection (e.g., physical damage detection) when processing the continuous images of one or more edges of one or more respective objects 108.

In various embodiments, the anomaly detection circuitry 216 can execute one or more operations related to the anomaly detection model. For example, the anomaly detection circuitry 216 can employ various image recognition and/or pattern recognition techniques while parsing image data related to the edges of one or more respective objects 108. For instance, in various embodiments, the anomaly detection circuitry 216 can be configured to search for defects, damage, and/or other anomalies related to the edge of a respective object 108. Furthermore, the anomaly detection circuitry 216 can determine one or more filters to apply to any image data that has been captured to better parse the data related to the edges of one or more respective objects 108. For example, the anomaly detection circuitry 216 can determine that certain data comprised within the captured image data related to a particular object 108 can be better interpreted if the image is converted into a greyscale coloring format instead of a full-color format. The anomaly detection circuitry 216 can also determine if a certain image file comprising captured image data could be better managed once converted into a different file type. For example, in some embodiments, the image data captured by an image capturing device associated with the edge-following system 102 may be initially stored as a .jpeg file type and later converted into a bitmap file type that might be easier manage and/or store. In some embodiments, the anomaly detection circuitry 216 may comprise one or more predetermined filters and/or other processes that are applied to all or a subset of the image data.

In some embodiments, the edge-following computing device 112 includes object localization circuitry 218 which comprises hardware, software, firmware, and/or a combination thereof, that supports functionality for determining one or more dimensional attributes associated with a respective object 108. In some embodiments, the object localization circuitry 218 may be configured to execute one or more operations related to an object localization model. For example, the object localization circuitry 218 may be configured to input one or more images of a silhouette of an object 108 into an object localization vision model. Based on the one or more images of the silhouette of the object 108, the object localization circuitry 218 can determine one or more dimensional attributes associated with the object 108. The one or more dimensional attributes can include, but are not limited to, at least one of a length, a width, a corner radius, a center, or an orientation of the object.

In exemplary embodiments, the edge-following computing device 112 includes machine learning model circuitry 220 which comprises hardware, software, firmware, and/or a combination thereof, that supports functionality for creating, training, updating, and/or maintaining one or more ML models (e.g., an anomaly detection model and/or an object localization vision model) according to various embodiments of the present disclosure. In various embodiments, the machine learning model circuitry 220 can work in conjunction with the processor 202, the input/output circuitry 208, the motion-planning circuitry 214, the anomaly detection circuitry 216, and/or the object localization circuitry 218 in order to create, train, update, and/or maintain the one or more models (e.g., the anomaly detection model and/or the object localization vision model) associated with the edge-following system 102. Additionally, in some embodiments, the machine learning model circuitry 220 can control one or more image capturing devices associated with the edge-following system 102 and/or receive image data, directly or indirectly, captured by the image capturing devices to facilitate the training of the one or more models associated with the edge-followings system 102.

In some embodiments, two or more of the sets of circuitries 202-220 are combinable. Additionally or alternatively, in some embodiments, one or more of the sets of circuitry perform some or all of the functionality described associated with another component. For example, in some embodiments, two or more of the sets of circuitries 202-216 are combined into a single module embodied in hardware, software, firmware, and/or a combination thereof. Similarly, in some embodiments, one or more of the sets of circuitries, for example the communications circuitry 206, the data storage circuitry 212, the motion-planning circuitry 214, the anomaly detection circuitry 216, the object localization circuitry 218, and/or the machine learning model circuitry 220 is/are combined with the processor 202, such that the processor 202 performs one or more of the operations described above with respect to each of these sets of circuitries 206 and 212-220.

Edge-Following Processes and Apparatuses

Figure 3A:
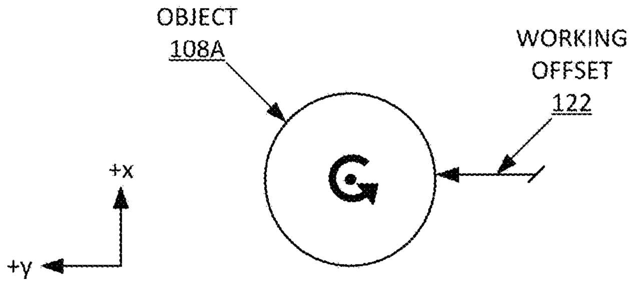
FIGS. 3A-B illustrate various edge-following principles associated with the methods described herein, in accordance with one or more embodiments of the present disclosure.
Figure 3B:
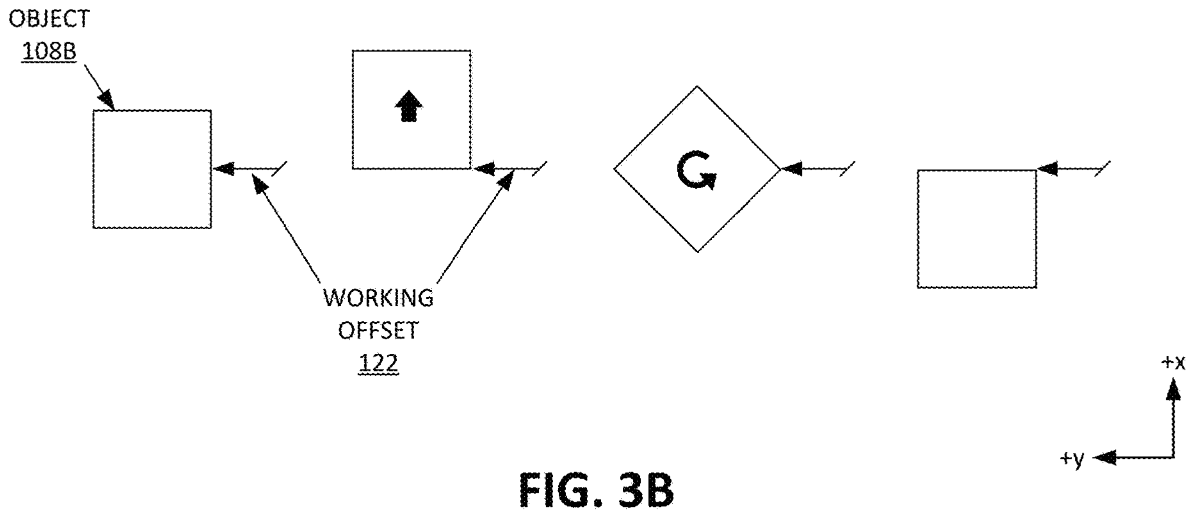

FIGS. 3A-B illustrate various edge-following principles to facilitate understanding the methods related to the various embodiments of the present disclosure described herein. The 2-dimensional shapes illustrated in FIGS. 3A-B can be used to described some of the fundamental principles used by an edge-following system 102 to execute an edge-following operation with respect to an object 108. In the depicted embodiments, the page comprises the x-y plane, with the z-axis being perpendicular to the page.

As described herein, a primary function of an edge-following operation may be that a working point on an edge of an object 108 stays in a same point in space (e.g., a same point on a particular coordinate plane) for the duration of the edge-following operation as the working point moves along the edge of the object. Various measurements, offsets, and/or orientations related to the object 108 and/or the one or more components of the edge-following system 102 may be determined. For example, as a result of one or more preliminary steps of the edge-following operation, one or more of a working offset 122 and/or a working orientation may be determined to ensure the edge of the object 108 stays in the same point in space throughout the duration of the edge-following operation.

Referencing FIG. 3A, an example object 108A characterized by a circular shape is shown being held at a working offset from an example ancillary tool (not shown). For each of the points on the outline of the object 108A to touch the tip of the arrow (e.g., be disposed at the working offset 122) while working on the edge of the object 108A, the object 108A would need to be rotated about the point in the middle of the object 108A, where the point in the middle of the object 108A is equidistant from all the points on the outline of the object 108A.

Referencing FIG. 3B, an example sequence of movements of an object 108B characterized by a square shape is shown being held at a working offset 122 from an example ancillary tool (not shown). In the illustrated embodiment, a working point is shown in each step of the sequence as the intersection of the working offset 122 and the edge of the object 108B. As can be seen in the image, the working point shifts along the circumference of the edge of the object 108B as the object 108B is moved. For each of the points of the outline of the object 108B to touch the tip of the arrow (e.g., be disposed at the working offset 122 while working on the edge of the object 108B), the object 108B may be translated (e.g., moved) linearly in order to follow the respective sides of the object 108B. In order to transition to another side (e.g., from a first side to a second side), the object 108B would need to be rotated about the point where two sides of the object 108B meet because the radius of curvature of each corner is zero.

For an object 108 that has characteristics of both a right angled object such as a pure square/rectangle such as object 108B and curved portions like a circle such as object 108A (e.g., a mobile device having rounded corners and at least partially straight sides), the two concepts from FIG. 3A and FIG. 3B can be combined and such that the point of rotation is moved to the point where the curve starts while keeping the point equidistant from the curve's points. In this manner, the edge-following system 102 may be configured to image an object 108 along an x-y plane having any cross-sectional combination of curves and/or straight sides.

Figure 4:
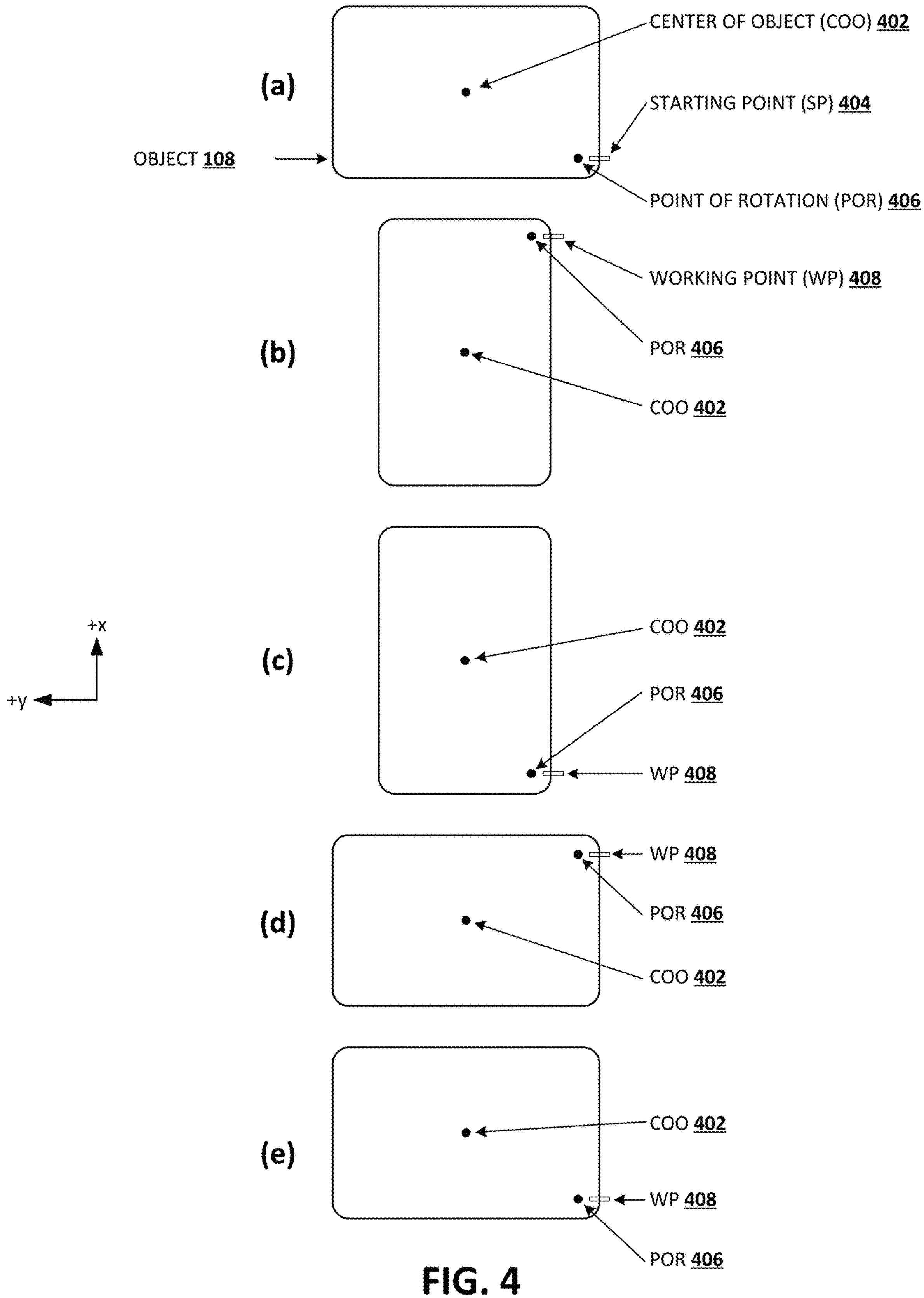
FIG. 4 illustrates various edge-following concepts related to an edge-following operation in accordance with one or more embodiments of the present disclosure.

FIG. 4 illustrates various edge-following concepts related to an edge-following operation in accordance with one or more embodiments of the present disclosure. As shown in FIG. 4, the edge-following system 102, as part of an edge-following operation can determine various reference points associated with an object 108. For example, as depicted in FIG. 4, one or more of a center-of-object (COO) 402, a starting point (SP) 404, a point of rotation (POR) 406, and/or a working point (WP) 408 can be determined for the object 108, such as by the object localization model and/or motion planning model.

The COO 402 refers to a center of an object 108 being manipulated by a handling tool 106 of the multi-axis robot 104. In various contexts, the COO 402 of the object can be used to determine an engagement point on the object 108 (e.g., a point by which to grip the object, such as a target for a suction tool) for the handling tool 106 of the multi-axis robot 104. In some embodiments, the COO 402 may be determined via one or more processes, including geometric calculation based on one or more other attributes of the object 108, via a machine learning model, or the like.

The SP 404 refers to a starting point on the edge of an object 108 that represents an initial working point of the edge-following system 102 at the start of the image generation process. The SP 404 may be arbitrarily assigned, may be chosen based on one or more specific reference points, or may otherwise be defined at or prior to the start of an edge-following operation. In some embodiments in which an entire edge is to be worked on by the ancillary tool 110, the starting point may also be an end point. In some embodiments, the starting point may be consistent between objects so that the machine learning models and other functions described herein (e.g., continuous image generation) are done from the same consistent start and end points. For example, the anomaly detection model may generate more accurate and consistent results if the continuous image begins with the same portion of the object (e.g., a particular side or location on a mobile deice) for each continuous image. In some embodiments, the starting point may be determined independently of the overall size and shape of the device (e.g., a certain distance or location relative to a common reference point between all mobile devices, such as a certain distance from the edge of the device, a certain long/short side of the device, etc.). The starting point may be consistent between different makes or models of objects, such as different makes or models of mobile devices. The starting point may be inconsistent between different makes or models of objects, such as different makes or models of mobile devices.

The POR 406 refers to a point of rotation associated with an object 108 that is derived, based at least in part, by a corner radius (e.g., radius of curvature) associated with the corners of the object 108. In various contexts, if an object 108 has curved portions (e.g., corners), the corner radius associated with the corners can be determined (e.g., as part of the edge-following operation) in order to derive the POR 406 of the object 108 when the ancillary tool 110 is working on the corner at issue. For example, as described herein, the corner radius of an object 108 can be determined based on one or more dimensional attributes associated with the object 108. In some embodiments in which an object 108 has four corners, four separate PORs 406 may be defined for rotation around each at different points of the edge-following operation as part of a motion-planning model, which may link the four PORs 406 with translational movement. In some embodiments, if an object 108 has rectangular corners, the POR 406 may be defined on the corners themselves (e.g., radius of curvature is zero). In some embodiments in which an object 108 has at least one corner with different a different corner radius than the other corners, at least one POR 406 may be defined differently than the other PORs 406.

A point of rotation (e.g., the POR 406) can be used during execution of the edge-following operation as a reference point about which the object 108 may be rotated during imaging of the respective corner associated with the POR 406 (e.g., the point of rotation may be kept stationary by the handling tool 106 of the multi-axis robot 104) such that the working offset 122 and/or the working orientation between (i) the WP 408 as it varies along the edge of the object 108 and (ii) the ancillary tool 110 are maintained, and the WP 408 associated with the edge of the object 108 remains in a same point in space relative to the ancillary tool 110 while the object 108 and/or ancillary tool 110 are being rotated. For an object 108 with an edge comprising four corners, there are four respective points of rotation. Similarly, for an object 108 with an edge comprising three corners, there are three respective points of rotation.

With reference to FIG. 4, the multi-axis robot may therefore move both rotationally and translationally because the multi-axis robot may not necessarily be attached at one or more points of rotation. For example, when the multi-axis robot is attached to the COO 402 or is otherwise configured to rotate about a degree of freedom offset from one or more of the POR, the multi-axis robot may be configured to rotate the COO about an arc centered upon the target POR (e.g., the POR associated with the corner currently being imaged) so that the POR remains stationary relative to the ancillary tool 110.

The WP 408 refers to a point on the edge of an object 108 that an edge-following system 102 is configured to target for work (e.g., via an ancillary tool 110 such as an image capturing device). In various embodiments, a WP 408 of an object 108 may be the point at which an image capturing device is focused and which is disposed at the working offset 122 and/or working orientation relative to the ancillary tool 110 (e.g., the image capturing device). The WP 408 may be maintained at the working offset and/or working orientation relative to the ancillary tool while the object is manipulated. The movement of the multi-axis robot may thereby cause the edge of the object to continuously be disposed on the working point while the particular location on the object coinciding with the working point moves along the length of the edge of the object 108 during the edge-following operation such that the ancillary tool 110 is configured to work along the edge or a portion thereof.

As depicted in FIG. 4, in some embodiments, the object 108 is continuously maintained in a same orientation with respect to the z axis while being manipulated (e.g., rotated and/or translated along the x and/or y axes). As described herein, the working orientation is an orientation of the working point (e.g., WP 408) of the object 108 relative to an ancillary tool 110 during execution of an edge-following operation. In order to maintain the working orientation and ensure that a working point (e.g., WP 408) associated with an edge of the object 108 remains in a same point in space relative to the ancillary tool 110 during the edge-following operation, the multi-axis robot 104 supports the object (e.g., by way of the handling tool 106) such that the object 108 remains at the same z axis point while the object 108 is rotated within an x-y plane and the working point (e.g., WP 408) is moved along the path of the edge (e.g., while being worked on by an ancillary tool 110), where the z axis is perpendicular to the edge of the object 108.

In some embodiments, the object 108 is not continuously maintained in the same orientation with respect to the z axis while being manipulated. For example, the object may be rotated relative to the x-y plane and the working point (e.g., WP 408) may move along a non-edge surface of the object (e.g., an upper or lower surface of the object). Rotating the object relative to the x-y plane may allow the inspection of additional surfaces of the object, such as non-edge surfaces of the object. This additional inspection may occur concurrent or sequential with an edge-surface inspection (e.g., using a second camera and/or by moving the camera and/or object).

FIG. 4 (*a*)-(*e*) depict a sequence of positions of the object 108 as it is moved relative to an ancillary tool while keeping the WP 408 at the same position (e.g., working offset and/or orientation) relative to the ancillary tool (e.g., ancillary tool 110 shown in FIG. 1). As shown in (a) of FIG. 4, the object 108 is in a beginning orientation and, in this example, the SP 404 is the point on a first side of the edge of the object 108 in which a particular edge-following operation may begin. As shown in (b) of FIG. 4, the object 108 has been rotated ninety degrees about a first POR 406 in a counter-clockwise direction and the WP 408 is now positioned on a second side (e.g., one of two longer sides of the object 108) of the edge of the object 108. As shown in (c) of FIG. 4, the object has been translated linearly in a positive direction along the x-axis associated with a coordinate plane related to the working orientation of the object 108 such that the WP 408 has moved along the second side of the object 108. As shown in (d) of FIG. 4, the object 108 has been rotated about a second POR 406 in a counter-clockwise direction and a WP 408 has been determined on a third side of the edge of the object 108 (e.g., associated with the width of the object 108). As shown in (e) of FIG. 4, the object has been translated linearly in a positive direction along the x-axis associated with a coordinate plane related to the working orientation of the object 108 such that the WP 408 has moved along the third side of the object 108. In the depicted embodiment, respective corners of the object 108 are imaged between (a) and (b) and between (c) and (d) of FIG. 4, and respective sides of the object 108 are imaged between (b) and (c) and between (d) and (e) of FIG. 4.

Example Edge-Following Operation

Figure 5A:
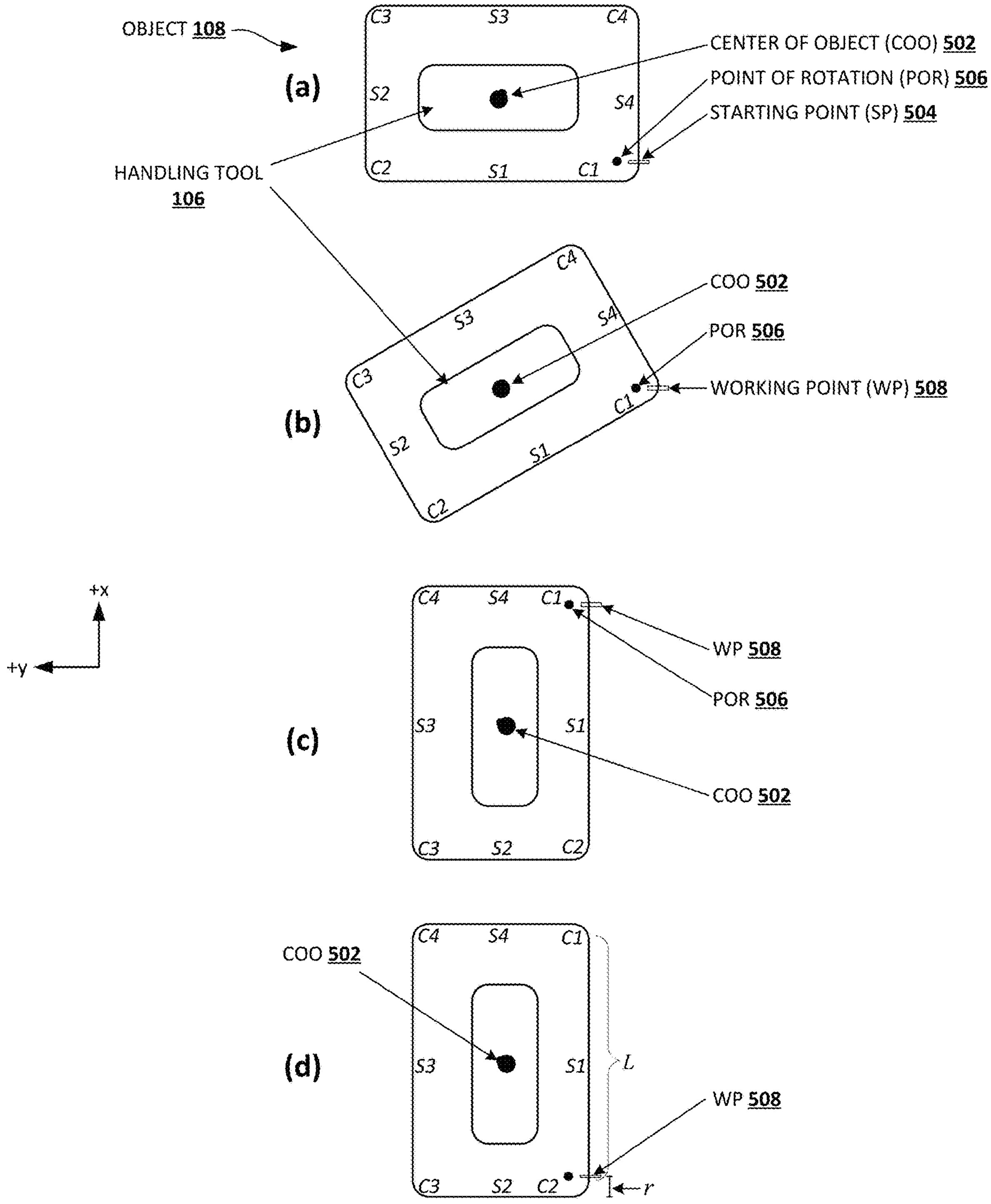
FIGS. 5A-B illustrate an exemplary edge-following operation in accordance with one or more embodiments of the present disclosure.
Figure 5B:
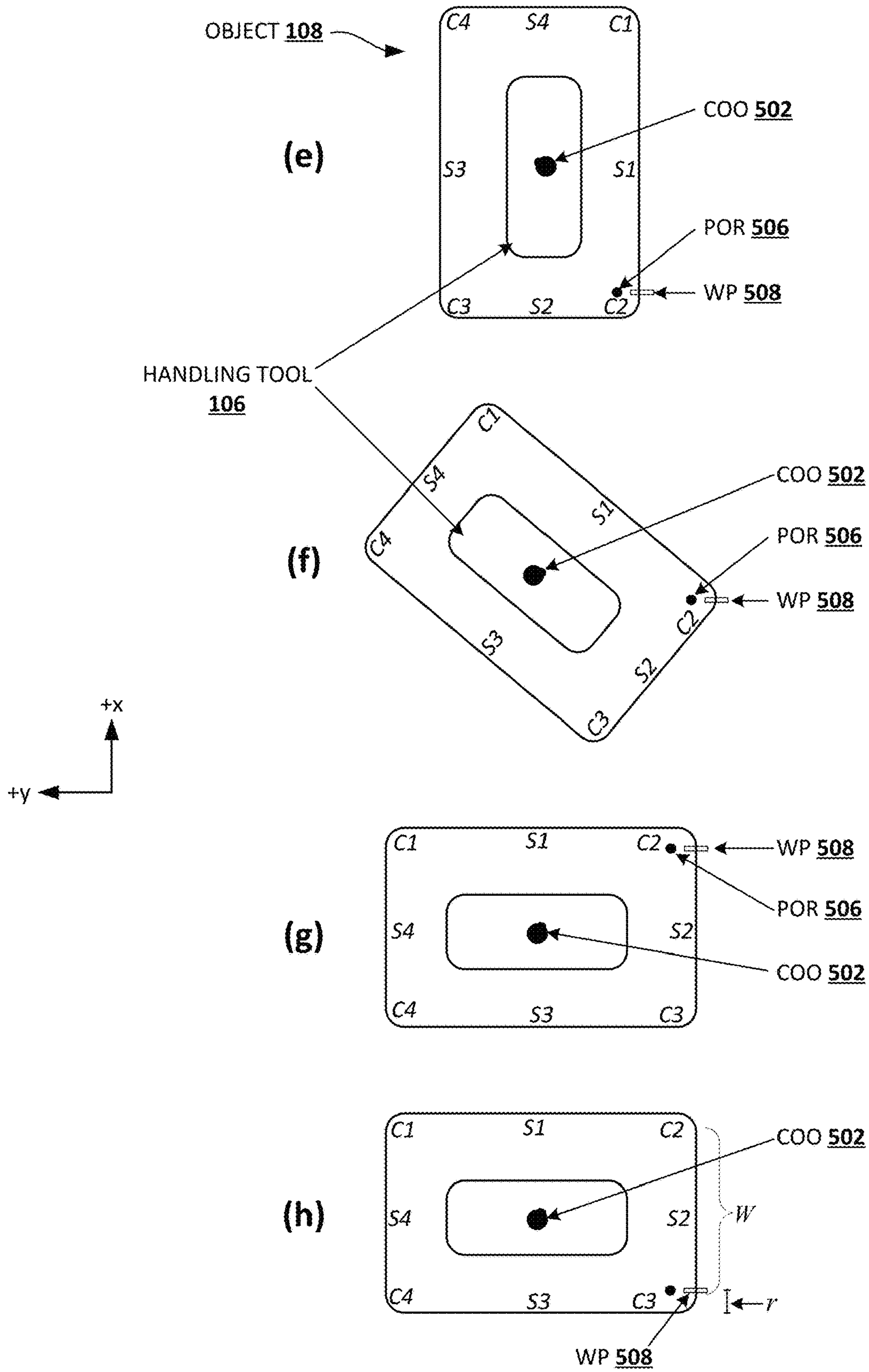

A detailed description of an example edge-following operation will now be provided. As such, FIGS. 5A-B will be referenced throughout in order to illustrate one or more processes, steps, and/or operations related to the exemplary edge-following operation. As shown in FIGS. 5A-B, the example edge-following operation makes use of one or more of a center-of-object (COO) 502, a starting point (SP) 504, a point of rotation (POR) 506, and/or a working point (WP) 508 associated with the object 108. Additionally, as shown in FIGS. 5A-B, the engagement point of the handling tool 106 associated with the COO 502 is also referenced. Furthermore, as shown in FIGS. 5A-B, the respective sides S1-S4 and corners C1-C4 associated with the edge of the object 108 have also been labeled.

In various embodiments, a motion-planning model comprising one or more equations, functions, calculations, computer-coded instructions, and/or commands related to the manipulation of an object 108 (e.g., a mobile device, such as a smartphone in the depicted embodiment) using the multi-axis robot (e.g., multi-axis robot 104 shown in FIG. 1) can be employed during the edge-following operation. As described herein, the motion-planning model may be an algorithmic, statistical, machine learning, and/or other model configured to be executed by hardware, software, or a combination of hardware and software configured to detect, determine, and/or execute the motion of one or more devices, objects 108, or other elements associated with the various systems and embodiments discussed herein. The motion-planning model may be configured to determine the movement of the object 108 (e.g., via determining computer-coded movement instructions for the multi-axis robot 104) and/or ancillary tool 110 necessary to control the relative position and/or orientation between the object 108 and the ancillary tool 110. The motion-planning model may comprise computer-coded instructions configured to determine one or more points of rotation and determine instructions to rotate the object 108 and/or ancillary tool 110 about the point(s) of rotation. The motion-planning model may further be configured to connect the rotational movement associated with two or more points of rotation with a translational movement associated with a linear side of the object 108. The computer-coded instructions may be transmitted, directly or indirectly, to the multi-axis robot and/or one or more other apparatuses in the system to cause the respective apparatuses to perform the calculated motion (e.g., such as, by way of non-limiting example, a set of C, C++, or Python coded instructions transmitted to and configured to be interpreted and executed by a processor of the multi-axis robot controlling a set of motors of the multi-axis robot based on a mapping of the robot handling tool position versus the instructed motor movements).

By way of non-limiting example, using a predetermined or arbitrarily chosen starting point (e.g., SP 504) on the edge of the object 108, the path followed to keep the working point (e.g., WP 508) of the followed edge in the same point in space relative to the ancillary tool 110 is determined by a motion-planning model that comprises finding new x and y points of the center of the object (e.g., COO 502) in space (e.g., on a particular coordinate plane) when rotating the object 108 in order to execute to the one or more processes on the edge of the object 108 (e.g., one or more image data capturing processes). For example, finding new x and y points related to the COO 502 in space when rotating the object 108 can be derived by:

$$x_1 = \cos\theta(x-m) + (y-n)\sin\theta + m; \qquad \text{Equation 1}$$

$$y_1 = -\sin\theta(x-m) + \cos\theta(y-n) + n; \qquad \text{Equation 2}$$

where θ is the angle of rotation when rotating the object 108 to follow outline of the object 108 in space; x is the current coordinate of the center of the object 108 (e.g., COO 502) in the x-axis of the plane; y is the current coordinate of the center of the object 108 (e.g., COO 502) in the y-axis of the plane; $x_1$ is the future (new) coordinate of the center of the object 108 (e.g., COO 502) in the x-axis of the plane; $y_1$ is the future (new) coordinate of the center of the object 108 (e.g., COO 502) in the y-axis of the plane; m is the current coordinate of the point of rotation (e.g., POR 506) of the object 108 in the x-axis; and n is the current coordinate of the point of rotation (e.g., POR 506) of the object 108 in the y-axis.

The formula to find the new coordinates when the object 108 is not being rotated is as follows:

$$y_1 = y + l \qquad \text{Equation 3}$$

where y is the current coordinate of the object 108 in the y-axis of the plane; $y_1$ is the future coordinate of the object 108 in the y-axis of the plane; and l is the length of the respective side of the edge of the object 108 (i.e., a distance between the end of one corner and the start of the next corner of the object, where the curvature of the side about the z axis is zero).

In various embodiments, a reference object can be used in order to configure, calibrate, initialize, and/or otherwise localize the various components of the edge-following system 102 such as, for example, the multi-axis robot 104. For example, a reference object (e.g., a prop, recreation, another object with known dimensions, or generalized representation of the actual object(s) to be worked on) with similar physical characteristics to one or more objects 108 can be used to calibrate and/or initialize the multi-axis robot 104 and/or the handling tool 106. Furthermore, in various embodiments, a remote tool center point (RTCP) frame and/or one or more position registers can be determined for the multi-axis robot 104 based on the reference object. In some embodiments, the center of the handling tool 106 can be engaged with at or otherwise associated with the COO 502. For example, the handling tool 106 may define at least one degree of rotational freedom about an axis, and the axis may intersect the COO when the handling tool is engaged with the object in some embodiments. In various examples, dimensional differences between the object and the reference object can be used to determine the RTCP frame or initial reference position. Furthermore, in various contexts, the center of the handling tool 106 and/or the COO 502 can be manipulated to keep the point (e.g., the working point) on which an ancillary tool 110 (e.g., an image capturing device) will focus during the execution of the edge-following operation at a constant working orientation and/or working offset, preferably both in some embodiments.

In various contexts, the center of the handling tool 106 and/or the COO 502 can be used to determine the RTCP frame. For example, RTCP frame can be recorded by setting an origin point to the center of the handling tool 106 and/or the COO 502. The handling tool 106 can then be moved linearly in the +x direction and the x origin point can be recorded (e.g., by the edge-following computing device 112). The handling tool 106 can be moved back to the origin point (e.g., the center of the handling tool 106 and/or the COO 502) and then the handling tool 106 can then be moved linearly in the +y direction and the y origin point can be recorded (e.g., by the edge-following computing device 112). The handling tool 106 can then be moved back to the origin point and the current frame associated with the multi-axis robot 104 can be changed to the RTCP frame and a RTCP position register can be recorded. For this example, the RTCP frame number is 2 and the RTCP position register number is 100.

Table 1 and Table 2, provided herein below, detail various variables and position registers respectively that may be used in the one or more equations and/or functions related to the motion-planning model of the exemplary edge-following operation. In various other examples, the various variables and position registers may not be derived from a table. For example, the various variables and position registers may be derived from other registers on runtime.

TABLE 1

| Variables | Values |
|---|---|
| R[1] | Width of object |
| R[2] | Length of object |
| R[3] | Half of R[1] = Half of width of object |
| R[4] | Half of R[2] = Half of length of object |
| R[5] | Radius of curved corners |
| R[6] | Current x-coordinate of object |
| R[7] | Current y-coordinate of object |
| R[8] | Angle of rotation |
| R[31] | Additional Example Variable |

TABLE 2

| Position Registers | Values |
|---|---|
| PR[100] | Reference starting point |
| PR[12] | Current point for object |
| PR[–, 1] | Position register –'s x coordinate |

TABLE 2-continued

| Position Registers | Values |
|---|---|
| PR[–, 2] | Position register –'s y coordinate |
| PR[3] | Position register for the 45 degree rotation |
| PR[4] | Position register for the 90 degree rotation |

The following details of the motion-planning model related to the exemplary edge-following operation comprise various instructions, calculations, operations, and/or commands represented as a plurality of steps characterized as pseudocode for the sake of brevity and ease of description. In various embodiments, the following instructions, calculations, operations, and/or commands represented in pseudocode can be associated with one or more computer-coded instructions that can be executed by one or more components of the edge-following system 102. For example, based on one or more computer-coded instructions associated with the motion-planning model, the edge-following computing device 112 can cause the handling tool 106 of the multi-axis robot 104 to manipulate an object 108.

The following, non-limiting example algorithm associated with the motion planning model is one example of a process that may be performed by the edge-following system during an edge-following operation. In an example algorithm including steps 1-6 shown below, various variables associated with the computer-coded instructions associated with the motion-planning model (e.g., one or more variables presented in Table 1) may be initialized.

| | | |
|---|---|---|
| 1. | UFRAME_NUM = 1 | |
| 2. | R[1] = VR[1].MES[1] | // Width of object 108 |
| 3. | R[2] = VR[1].MES[2] | // Length of object 108 |
| 4. | R[3] = R[1] / 2 | // Half of width of object 108 |
| 5. | R[4] = R[2] / 2 | // Half of length of object 108 |
| 6. | R[5] = VR[1].MES[3] | // Corner radius of object 108 |

The user frame (e.g., designated space) the multi-axis robot 104 is moving in may be the frame in which the pick-up position of the object 108 is recorded. The handling tool 106 may be centered over the object 108 when engaging the object 108 (e.g., as in step 7), and the center of the handling tool 106 will, in such embodiments, be directly over the COO 502. The RTCP user frame with which the reference RTCP position register was initially recorded in is also initialized (e.g., as in step 8).

As shown in the positioning shown in (a) of FIG. **5*a*, the handling tool 106 is moved such that the edge of the object 108 is in a starting position and SP 504 is defined (e.g., as instructed in steps 9-11 provided above). In at least some embodiments in which the ancillary tool 110 is an image capturing device, this starting position may be associated with a working offset 122** related to a focal length of a telecentric lens associated with the image capturing device.

| | | |
|---|---|---|
| 7. | PICK UP OBJECT 108 | |
| 8. | UFRAME_NUM = 2 | // RTCP frame |
| 9. | PR[1,1] = PR[100,1] + R[3] − R[5] | // Update starting point x for object 108 |
| 10. | PR[1,2] = PR[100,2] + R[4] | // Update starting point y for object 108 |
| 11. | L PR[1] | // Move to starting point for object 108 |

In step 12, a position register PR[2] is initialized, where the PR[2] is associated with the point in space for the robot to be at after rotating the object 108 a total of 45 degrees.

12. PR[2]=PR[1]

In steps 13-18, the variables used in Equations 1 and 2 are initialized.

| | | |
|---|---|---|
| 13. | R[6] = PR[2,1] | // Current x-coordinate of center of object 108 |
| 14 | R[7] = PR[2,2] | // Current y-coordinate of center of object 108 |
| 15. | R[8] = 45 | // Angle of rotation |
| 16. | R[9] = PR[2,1] − R[3] + R[5] | // x-coordinate of point of rotation |
| 17. | R[10] = PR[2,2] − R[4] + R[5] | // y-coordinate of point of rotation |
| 18. | R[11] = (0 − R[8]) | |

In steps 19-20, Equations 1 and 2 are executed to determine new x and y coordinates of the center of the object 108 (e.g., COO 502) in space (e.g., on a particular coordinate plane) that represent the 45-degree rotation of the object 108.

19.

$$R[11] = ((R[7] - R[10]) * \sin R[11] + R[9]) + ((R[6] - R[9]) * \cos R[11])$$

20.

$$R[12] = (((\cos R[11]) * (R[7] - R[10])) + R[10]) + ((0 - \sin R[11]) * (R[6] - R[9]))$$

In steps 21-24, positions registers are set for the newly determined x and y coordinates.

21.

$$PR[3] = PR[1]$$

22.

$$PR[3,1] = R[11]$$

23.

$$PR[3,2] = R[12]$$

24.

$$PR[3,6] = PR[3,6] + R[8]$$

In steps 25-37, a position register for a new point in space of the object 108 (e.g., the point in space associated with the COO 502) is determined by using the current point in space of the object 108, the next desired angle of rotation (e.g., 90 degrees), the x-coordinate point of rotation (e.g., associated with the POR 506), and the y-coordinate point or rotation (e.g., associated with the POR 506).

| | | |
|---|---|---|
| 25. | PR[2] = PR[1] | |
| 26. | R[6] = PR[2,1] | // Current x-coordinate of center of object 108 |
| 27. | R[7] = PR[2,2] | // Current y-coordinate of center of object 108 |
| 28. | R[8] = 90 | |
| 29. | R[9] = PR[2,1] − R[3] + R[5] | // x-coordinate of point of rotation |
| 30. | R[10] = PR[2,2] − R[4] + R[5] | // y-coordinate of point of rotation |
| 31. | R[11] = (0 − R[8]) | |
| 32. | R[11] = ((R[7] − R[10]) * sin R[11] + R[9]) + ((R[6] − R[9]) * cos R[11]) | |
| 33. | R[12] = (((cos R[11]) * (R[7] − R[10])) + R[10]) + ((0 − sin R[11]) * (R[6] − R[9])) | |
| 34. | PR[4] = PR[1] | |
| 35. | PR[4,1] = R[11] | |
| 36. | PR[4,2] = R[12] | |
| 37. | PR[4,6] = PR[4,6] + R[8] | |

Steps 12 to 24 can be repeated to determine the next angle of rotation R[8] which, in this example, is set to 90 (e.g., 90 degrees) as depicted in (c) of FIG. 5A.

Step 38 is associated with a command to perform (e.g., by the handling tool 106) the 45-degree rotation for the object 108 (e.g., as depicted in (b) of FIG. 5A).

38. L PR[3] CNT100 PTH RTCP

Step 39 is associated with a command to perform (e.g., by the handling tool 106) the 90-degree rotation for the object 108 (e.g., as depicted in (c) of FIG. 5A). At this point, the object 108 has undergone a 90-degree rotation and, in an example embodiment in which the edge of the object 108 was being imaged by an image capturing device (e.g., a camera), image data related to corner C1 would have been captured.

39. L PR[4] CNT100 PTH RTCP

Next, as depicted in (d) of FIG. 5A, the object 108 is translated linearly in the +x direction to follow the side of the object 108, with a movement derived by:

$$\text{distance} = L - 2r \quad \text{Equation 4}$$

where L is the length of the long side of the object 108 and r is the radius of the curve of the object 108 (e.g., a corner radius determined when the one or more dimensional attributes of the object 108 were determined via, for example, an object localization vision model). At this point, in an example embodiment in which the edge of the object 108 was being imaged by an image capturing device (e.g., a camera), image data related to corner C1 and side S1 would have been captured.

In steps 40-42, the point of rotation (e.g., POR 506) is set for the next curve of the object 108, as well as a future position register for a 45-degree rotation of the object 108.

| | |
|---|---|
| 40. | PR[1] = PR[4] |
| 41. | PR[1,1] = PR[12,1] + R[2] − R[5] − R[5] |
| 42. | L PR[1] CNT100 PTH RTCP |

Since the orientation of the object 108 has changed, in steps 47 and 48 the values of the length and width variables associated with the object 108 are switched (e.g., the length and width values previously determined in steps 16 and 17). Furthermore, WP 508 (e.g., as shown in (e) of FIG. 5B) is also determined.

```
43. PR[2] = PR[1]
44. R[6] = PR[2,1]                     // Current x-coordinate of center of object 108
45. R[7] = PR[2,2]                     // Current y-coordinate of center of object 108
46. R[8] = 45                          // Angle of rotation
47. R[9] = PR[2,1] − R[4] + R[5]       // x-coordinate of point of rotation
48. R[10] = PR[2,2] − R[3] + R[5]      // y-coordinate of point of rotation
49. R[11] = (0 − R[8])
50. R[11] = ((R[7] − R[10]) * sin R[11] + R[9]) + ((R[6] − R[9]) * cos R[11])
51. R[12] = (((cos R[11]) * (R[7] − R[10])) + R[10]) + ((0 − sin R[11]) *
    (R[6] − R[9]))
52. PR[3] = PR[1]
53. PR[3,1] = R[11]
54. PR[3,2] = R[12]
55. PR[3,6] = PR[3,6] + R[8]
```

In steps 56-68, the future position register for a 90-degree rotation of the object 108 is determined.

```
56. PR[2] = PR[1]                      // Get current coordinates of center of object 108
57. R[6] = PR[2,1]                     // Current x-coordinate of center of object 108
58. R[7] = PR[2,2]                     // Current y-coordinate of center of object 108
59. R[8] = 90                          // Angle of rotation
60. R[9] = PR[2,1] − R[4] + R[5]       // x-coordinate of point of rotation
61. R[10] = PR[2,2] − R[3] + R[5]      // y-coordinate of point of rotation
62. R[11] = (0 − R[8])
63. R[11] = ((R[7] − R[10]) * sin R[11] + R[9]) + ((R[6] − R[9]) * cos R[11])
64. R[12] = (((cos R[11]) * (R[7] − R[10])) + R[10]) + ((0 − sin R[11]) *
    (R[6] − R[9]))
65. PR[4] = PR[1]
66. PR[4,1] = R[11]
67. PR[4,2] = R[12]
68. PR[4,6] = PR[4,6] + R[8]
```

Step 69 is associated with a command to move the object 108 (e.g., via the handling tool 106) to the point associated with the previously determined 45-degree rotation (e.g., as depicted in (f) of FIG. 5B).

69. L PR[3] CNT100 RTCP PTH

Step 70 is associated with a command to move the object 108 (e.g., via the handling tool 106) to the point associated with the previously determined 90-degree rotation (e.g., as depicted in (g) of FIG. 5B). At this point, in an example embodiment in which the edge of the object 108 was being imaged by an image capturing device (e.g., a camera), image data related to corner C1, side S1, and corner C2 would have been captured.

70. L PR[4] CNT100 RTCP PTH

In steps 71-73, the object 108 is translated linearly in the +x direction with:

$$\text{distance} = W - 2r \qquad \text{Equation 5}$$

where W is the width of the object 108 and r is the radius of the curved corner (e.g., as depicted in (h) of FIG. 5B).

```
71. PR[1] = PR[4]
72. PR[1,1] = PR[1,1] + R[1] − R[5] − R[5]
73. L PR[1] CNT100 PTH RTCP
```

At this point, in an example embodiment in which the edge of the object 108 was being imaged by an image capturing device (e.g., a camera), image data related to corner C1, side S1, corner C2, and side S2 would have been captured.

Steps 12 to 73 can be repeated in order to follow the next two sides (e.g., sides S3 and S4 respectively) and corners (e.g., corners C3 and C4 respectively) associated with the edge of the object 108. In this example, only the 45-degree and 90-degree rotation angles were calculated. However, it will be appreciated that if more points or rotation are needed, those angles can be calculated as well and added to the motion-planning model associated with edge-following operation. The foregoing is an example of the planned motion of the object (e.g., a mobile device in the depicted example) determined and instructed by the motion-planning model. Any individual portion or subset of the subdivided or replaced without departing from the spirit of the present disclosure. For example, some algorithms may be configured to move and work on the object across one or more sides and/or one or more corners. Some algorithms may be configured to move and work on the object across two or more sides with at least one corner in between. Some algorithms may be configured to move and work on the object across two or more corners with at least one side in between.

Example Processes of the Disclosure

Figure 6:
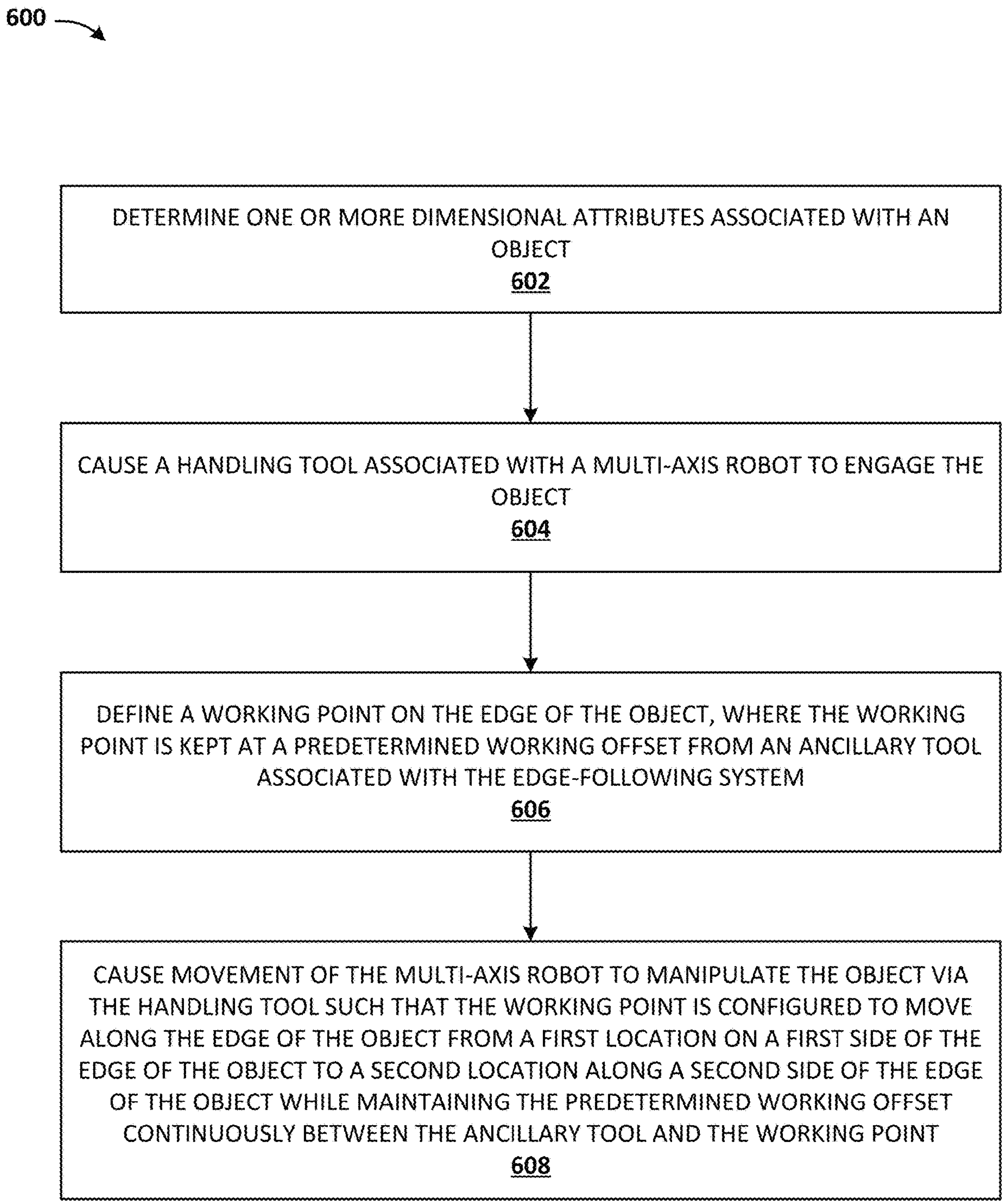
FIG. 6 illustrates a flowchart representing a process for following at least a portion of an edge of an object via an edge-following system in accordance with one or more embodiments of the present disclosure.

FIG. 6 illustrates a flowchart representing a process 600 for following at least a portion of an edge of an object via an edge-following system in accordance with one or more embodiments of the present disclosure. In some embodiments, the process 600 is embodied by computer program code stored on a non-transitory computer-readable storage medium of a computer program product configured for execution by the respective apparatuses described herein to perform the process as depicted and described. Additionally or alternatively, in some embodiments, the process 600 is performed by one or more specially configured computing devices such as the edge-following computing device 112 alone or in communication with one or more other component(s), device(s), and/or system(s) (e.g., the edge-following system 102). In this regard, in some such embodiments, the edge-following computing device 112 is specially configured by computer-coded instructions (e.g., computer program instructions) stored thereon, for example in the memory 204 and/or another component depicted and/or described herein and/or otherwise accessible to the edge-following computing device 112, for performing the operations as depicted and described. In some embodiments, the edge-following computing device 112 is embodied by, or in communication with, one or more external apparatus(es), system(s), device(s), and/or the like (e.g., the multi-axis robot and/or ancillary tool, each of which may have its own processor and/or memory or may share processing and/or memory with the edge-following computing device and/or another computing device), to perform one or more of the operations as depicted and described. For example, the edge-following computing device 112 can be in communication with the image capturing devices, the datastore 114, and/or the network 116 integrated with the edge-following system 102. For purposes of simplifying the description and without limitation, the process 600 is described as performed by and from the perspective of the edge-following computing device 112.

The process 600 begins at operation 602. At operation 602, the edge-following computing device 112 includes means, such as the processor 202, memory 204, communications circuitry 206, input/output circuitry 208, display 210, data storage circuitry 212, motion-planning circuitry 214, anomaly detection circuitry 216, object localization circuitry 218, and/or machine learning model circuitry 220, or any combination thereof, that determines one or more dimensional attributes associated with an object 108. As described herein, in some embodiments, the edge-following system 102 can identify, receive, retrieve, measure, and/or otherwise determine one or more dimensional attributes associated with a respective object 108. For example, the edge-following system 102 may employ an object localization vision model to determine the one or more dimensional attributes associated with a respective object 108. The one or more dimensional attributes can include, but are not limited to, at least one of a length, a width, a depth, a corner location, a corner radius (e.g., radius of curvature), a center, an area, a position, an orientation, or any other external physical characteristics of the object.

In some embodiments, the object localization vision model may be configured to directly measure the one or more dimensional attributes (e.g., using image data to determine a length, width, etc. of the object based on a predetermined reference length in the image data and/or calibration of the camera and platform locations to enable measurement of dimensions), to programmatically calculate one or more dimensional attributes (e.g., a surface area calculated from a length and a width), indirectly determine the one or more dimensional attributes (e.g., read, via image data and/or electronic transmission data from the object and/or a third-party computing device, data associated with the object 108, which data may include dimensional attributes or other data, such as make and model data, from which the dimensional attributes may be determined), or to otherwise gather or determine the one or more dimensional attributes. The object localization vision model may work in conjunction with the motion-planning model to facilitate engagement between the multi-axis robot 104 and the object by helping to align and/or determine an engagement location on the object for the multi-axis robot 104. Additionally or alternatively, in various embodiments, the dimensional attributes may be determined by direct measurement or indirect determination (e.g., via reading a make and model from a USB connection to the object 108 or from a programmatic visual inspection of the image data comprising an image of the object 108) such as via the object localization vision model At operation 604, the edge-following computing device 112 includes means, such as the processor 202, memory 204, communications circuitry 206, input/output circuitry 208, display 210, data storage circuitry 212, motion-planning circuitry 214, anomaly detection circuitry 216, object localization circuitry 218, and/or machine learning model circuitry 220, or any combination thereof, that causes a handling tool 106 associated with a multi-axis robot 104 to engage the object 108. For example, the handling tool 106 associated with the multi-axis robot 104 may be an engagement tool that can be configured to manipulate an object 108. In some embodiments, the handling tool 106 may be an integral part of the multi-axis robot 104 (e.g., a distal end of a continuous robot arm) or may be separately attached and/or interchanged with one or more other handling tools 106 (e.g., via a clamp assembly, such as a chuck). In some embodiments, the handling tool 106 can be an end effector (e.g., a peripheral device) that can be mechanically coupled to the multi-axis robot 104 and configured to manipulate one or more objects 108. In various contexts, the end effector can be a tool configured to operably engage the object 108 (e.g., a vacuum tool, a grasping tool, an adhesive tool, or the like) and rotate and/or translate the object 108 along one or more respective axes to facilitate the execution of an edge-following operation.

The multi-axis robot 104, including the handling tool 106, may cooperate to move the object 108 asymmetrically relative to the point of engagement between the multi-axis robot 104 and the object 108. For example, a handling tool 106 may engage a center of the object 108 from the z-axis direction and may be configured to rotate about axes extending through one or more points of rotation parallel to the z-axis direction in addition to translating the object 108 within the x-y plane. The multi-axis robot 104, including the handling tool 106, may comprise one or more linkages and motors, pistons, and/or the like for multi-axis movement of the object 108.

At operation 606, the edge-following computing device 112 includes means, such as the processor 202, memory 204, communications circuitry 206, input/output circuitry 208, display 210, data storage circuitry 212, motion-planning circuitry 214, anomaly detection circuitry 216, object localization circuitry 218, and/or machine learning model circuitry 220, or any combination thereof, that defines a working point on the edge of the object 108, where the working point is kept at a predetermined working offset 122 from an ancillary tool 110 associated with the edge-following system 102. For example, based in part on the dimensional attributes of the object 108, one or more reference points associated with the edge of the object 108 can be determined in order to facilitate actions and/or manipulations of the object 108 by, for example, the multi-axis robot 104 and/or an ancillary tool 110. The one or more reference points associated with the edge of the object 108 can be used in a motion-planning model related to the edge-following operation and can include, but are not limited to, a center-of-object, a starting point, a working point, and/or one or more points of rotation.

The working point (e.g., WP 408) refers to a point on the edge of an object 108 that an edge-following system 102 is configured to target for work (e.g., via an ancillary tool 110 such as an image capturing device). In various embodiments, a working point (e.g., WP 408) of an object 108 may be the point at which an image capturing device is focused and which is disposed at the working offset 122 from the image capturing device. The working point (e.g., WP 408) may move along an edge of the object 108 during the edge-following operation such that the ancillary tool 110 is configured to work along the edge or a portion thereof.

At operation 608, the edge-following computing device 112 includes means, such as the processor 202, memory 204, communications circuitry 206, input/output circuitry 208, display 210, data storage circuitry 212, motion-planning circuitry 214, anomaly detection circuitry 216, object localization circuitry 218, and/or machine learning model circuitry 220, or any combination thereof, that causes movement of the multi-axis robot 104 to manipulate the object 108 via the handling tool 106 such that the working point is configured to move along the edge of the object 108 from a first location on a first side of the edge of the object 108 to a second location along a second side of the edge of the object 108 while maintaining the predetermined working offset 122 continuously between the ancillary tool 110 and the working point, where the edge of the object 108 comprises surfaces along a plurality of sides connected with corners, and where the plurality of sides include the first side and the second side.

As described herein, the multi-axis robot 104 is configured to support and/or manipulate the object 108 while keeping a working point associated with the edge of the object 108 at a predetermined working orientation. The working orientation is an orientation of the working point of the object 108 relative to an ancillary tool 110 during execution of an edge-following operation. In order to maintain the working orientation and ensure that a working point associated with an edge of the object 108 remains in a same point in space relative to the ancillary tool 110 during the edge-following operation, the multi-axis robot 104 supports the object (e.g., by way of the handling tool 106) such that the object 108 remains at the same z-axis point while the object 108 is rotated within an x-y plane and the working point is moved along the path of the edge (e.g., while being worked on by an ancillary tool 110), where the z-axis is perpendicular to the edge of the object 108.

In this regard, the edge-following computing device 112 can execute various operations related to a motion-planning model associated with an edge-following operation performed by the edge-following system 102 with respect to a particular object 108. The motion-planning model may be configured to detect, determine, and/or execute the motion of one or more devices, objects 108, or other elements associated with the various systems and embodiments discussed herein. In various embodiments, a motion-planning model comprising one or more equations, functions, calculations, computer-coded instructions, and/or commands related to the manipulation of an object. The motion-planning model may be configured to determine the movement of the object 108 (e.g., via determining computer-coded movement instructions for the multi-axis robot 104) and/or ancillary tool 110 necessary to control the relative position and/or orientation between the object 108 and the ancillary tool 110. In this regard, the motion-planning model may comprise computer-coded instructions configured to determine one or more points of rotation and/or determine instructions to rotate the object 108 and/or ancillary tool 110 about the point(s) of rotation. The motion-planning model may further be configured to connect the rotational movement associated with two or more points of rotation with a translational movement associated with a linear side of the object 108.

Figure 7:
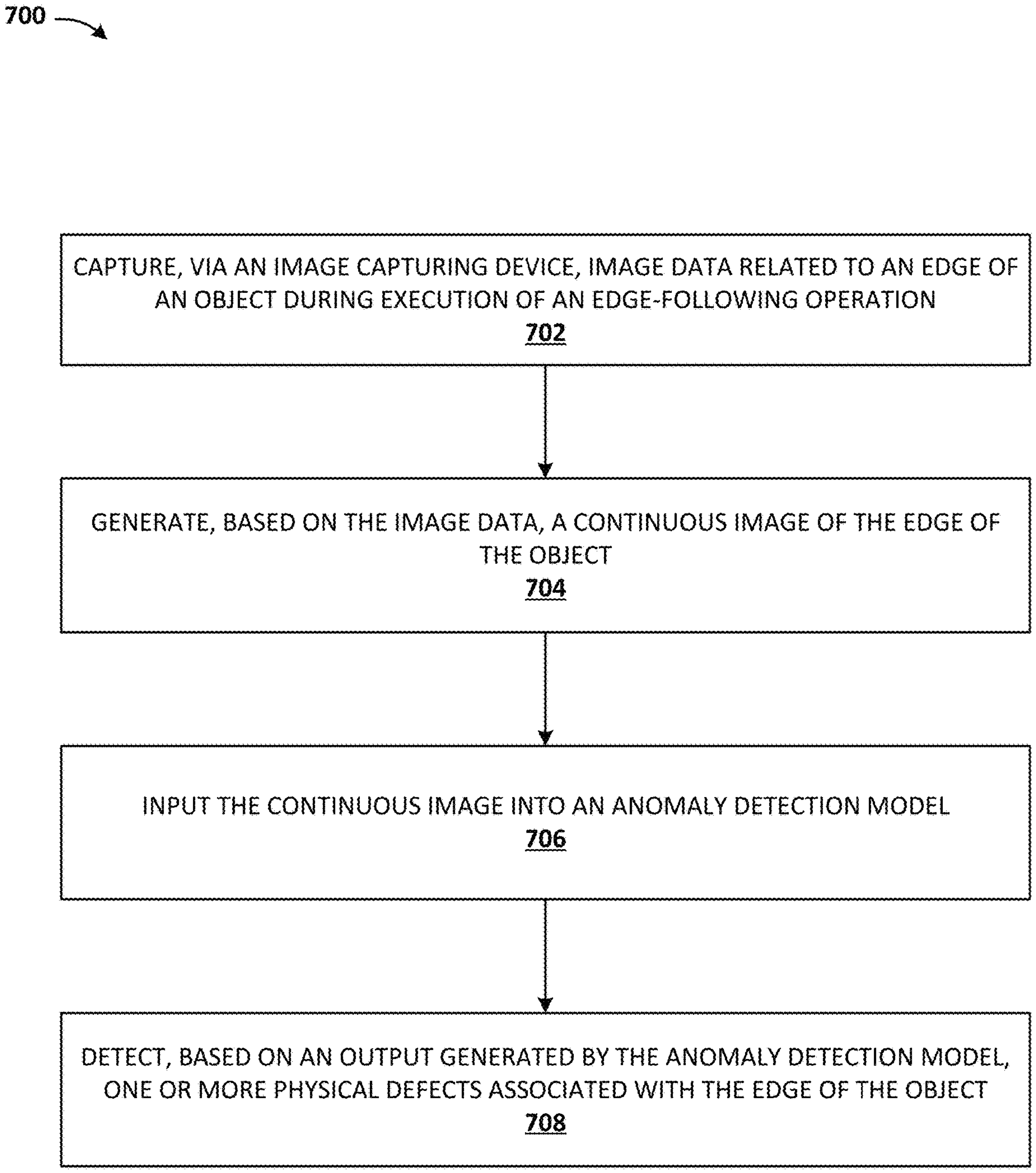
FIG. 7 illustrates a flowchart representing a process for using image data to detect one or more physical defects associated with an edge of an object in accordance with one or more embodiments of the present disclosure.

FIG. 7 illustrates a flowchart representing a process 700 for using image data to detect one or more physical defects associated with an edge of an object in accordance with one or more embodiments of the present disclosure. In some embodiments, the process 700 is embodied by computer program code stored on a non-transitory computer-readable storage medium of a computer program product configured for execution by the respective apparatuses described herein to perform the process as depicted and described. Additionally or alternatively, in some embodiments, the process 700 is performed by one or more specially configured computing devices such as the edge-following computing device 112 alone or in communication with one or more other component(s), device(s), and/or system(s) (e.g., the edge-following system 102). In this regard, in some such embodiments, the edge-following computing device 112 is specially configured by computer-coded instructions (e.g., computer program instructions) stored thereon, for example in the memory 204 and/or another component depicted and/or described herein and/or otherwise accessible to the edge-following computing device 112, for performing the operations as depicted and described. In some embodiments, the edge-following computing device 112 is embodied by, or in communication with, one or more external apparatus(es), system(s), device(s), and/or the like (e.g., the multi-axis robot and/or ancillary tool, each of which may have its own processor and/or memory or may share processing and/or memory with the edge-following computing device and/or another computing device), to perform one or more of the operations as depicted and described. For example, the edge-following computing device 112 can be in communication with the image capturing devices, the datastore 114, and/or the network 116 integrated with the edge-following system 102. For purposes of simplifying the description and without limitation, the process 600 is described as performed by and from the perspective of the edge-following computing device 112.

The process 700 begins at operation 702. In some embodiments, the process 700 begins after one or more operations depicted and/or described with respect to any one of the other processes described herein. For example, in some embodiments as depicted, the process 700 begins after execution of operation 602. In this regard, some or all of the process 700 may replace or supplement one or more blocks depicted and/or described with respect to any of the processes described herein. Upon completion of the process 700, the flow of operations may terminate. Additionally or alternatively, as depicted, upon completion of the process 700 in some embodiments, flow may return to one or more operation(s) of another process.

At operation 702, the edge-following computing device 112 includes means, such as the processor 202, memory 204, communications circuitry 206, input/output circuitry 208, display 210, data storage circuitry 212, motion-planning circuitry 214, anomaly detection circuitry 216, object localization circuitry 218, and/or machine learning model circuitry 220, or any combination thereof, that captures, via an image capturing device, image data related to an edge of an object 108 during execution of an edge-following operation. In various embodiments, an ancillary tool 110 of the edge-following system 102 may be an image capturing device configured to capture image data related to the edge of the object 108. An image capturing device may include a camera (e.g., a photographic camera, a video camera, a LIDAR camera, or any other device capable of imaging the object for one or more of the respective functions described herein). In such embodiments, the image capturing device can capture one or more types of image data including, but not limited to, one or more still photos, one or more bursts photos, and/or one or more videos that can be directly or indirectly used to make a continuous image of the edge of an object 108. As such, in various contexts, the working offset 122 maintained between the image capturing device and a working point associated with the edge of the object 108 during the execution of an edge-following operation can correspond to a predefined focal length of a lens associated with the image capturing device.

At operation 704, the edge-following computing device 112 includes means, such as the processor 202, memory 204, communications circuitry 206, input/output circuitry 208, display 210, data storage circuitry 212, motion-planning circuitry 214, anomaly detection circuitry 216, object localization circuitry 218, and/or machine learning model circuitry 220, or any combination thereof, that generates, based on the image data, a continuous image of the edge of the object 108. For example, in various embodiments, the edge-following computing device 112 may be configured to programmatically generate a continuous image related to the edge of an object 108. The continuous image may comprise multiple combined portions of image data (e.g., a composite image comprising multiple images or portions of images). In various embodiments, the continuous image represents at least a portion of one or more surfaces of an object 108. In some embodiments, the continuous image may represent a three-dimensional object as a two-dimensional image by compositing images captured from multiple surfaces (e.g., multiple sides and/or corners) of an object in a single linear image. In combination with maintaining the working offset and/or working orientation, the resulting continuous image may appear to be a single image of some or all of the edge of the object.

The continuous image of the edge of the object 108 may be a composite image made up of a plurality of still photos and/or video data captured of the edge of the object 108 by an image capturing device as the object 108 is manipulated (e.g., rotated and/or translated) by the multi-axis robot 104. As such, the continuous image of the edge of the object 108 comprises data related to the plurality of sides and corners associated with the edge of the object 108. In various embodiments, the image capturing device can be outfitted with a telecentric lens and configured such that an image sensor associated with the image capturing device is active while the object 108 is manipulated by the multi-axis robot 104 such that the images captured by the image capturing device are stitched together to make a single, continuous image of the edge of the object 108.

At operation 706, the edge-following computing device 112 includes means, such as the processor 202, memory 204, communications circuitry 206, input/output circuitry 208, display 210, data storage circuitry 212, motion-planning circuitry 214, anomaly detection circuitry 216, object localization circuitry 218, and/or machine learning model circuitry 220, or any combination thereof, that inputs the continuous image into an anomaly detection model. For example, the edge-following computing device 112 may be configured to execute one or more operations related to an anomaly detection model and/or an object localization vison model associated with the edge-following system 102. As described herein, the anomaly detection model may be configured to detect, calculate, extract, and/or otherwise determine particular data associated with a state of an object 108 from image data. In various embodiments, the anomaly detection model can determine whether one or more physical defects exist on an edge of an object 108 captured in a continuous image of the edge of the object. Non-limiting examples of an anomaly detection model include a trained convolutional neural network (CNN), a trained machine learning model, a trained artificial intelligence, and/or at least one image processing algorithm. In various embodiments, the anomaly detection model is trained using image data captured by one or more cameras associated with the edge-following system 102. Said image data can include, but is not limited to, image data related to one or more continuous images of one or more edges of one or more respective objects 108.

Furthermore, in some embodiments, the edge-following computing device 112 can execute one or more pre-processing steps on a continuous image to facilitate input into an anomaly detection model. Additionally or alternatively, the edge-following computing device 112 can apply one or more filters to the continuous image including, but not limited to, a gaussian blur filter, an inversion filter, color corrections such as a grayscale conversion filter, and/or one or more linear filters. In some embodiments, applying the one or more filters may enable higher accuracy of anomaly detection (e.g., physical damage detection) when processing the continuous images of one or more edges of one or more respective objects 108.

At operation 708, the edge-following computing device 112 includes means, such as the processor 202, memory 204, communications circuitry 206, input/output circuitry 208, display 210, data storage circuitry 212, motion-planning circuitry 214, anomaly detection circuitry 216, object localization circuitry 218, and/or machine learning model circuitry 220, or any combination thereof, that detects, based on an output generated by the anomaly detection model, one or more physical defects associated with the edge of the object 108. For example, in some embodiments the edge-following computing device 112 (e.g., via the anomaly detection model) can compare a continuous image to other previously collected image data stored in the datastore 114. Additionally or alternatively, in various embodiments, the edge-following computing device 112 (e.g., via the anomaly detection model) can employ various image recognition and/or pattern recognition techniques while parsing image data related to the edges of one or more respective objects 108 (e.g., comprised within a particular continuous image). For instance, in various embodiments, the anomaly detection model can be configured to search for defects, damage, and/or other anomalies related to the edge of a respective object 108. Furthermore, the edge-following computing device 112 can determine one or more filters to apply to any image data that has been captured to better parse the data related to the edges of one or more respective objects 108. For example, the edge-following computing device 112 (e.g., via the anomaly detection model) can determine that certain data comprised within the captured image data related to a particular object 108 can be better interpreted if the image is converted into a greyscale coloring format instead of a full-color format. The edge-following computing device 112 may also determine if a certain image file comprising captured image data could be better managed once converted into a different file type. For example, in some embodiments, the image data captured by an image capturing device associated with the edge-following system 102 may be initially stored as a .jpeg file type and later converted into a bitmap file type that might be easier manage and/or store. In some embodiments, the edge-following computing device 112 may comprise one or more predetermined filters and/or other processes that are applied to all or a subset of the image data related to a continuous image.

The various processes described herein are configured for use in a reverse-logistics environment in which a provider may receive and process tens-of-thousands to millions of objects (e.g., mobile devices). Embodiments of the present systems, apparatuses (including devices), computer programs, and methods may be configured to facilitate one or more edge-following operations in order to capture image data related to one or more edges of one or more respective objects in order to detect physical damage associated with the one or more edges. Embodiments of the present disclosure may facilitate such edge-following operations with little to no user interaction with the objects. Furthermore, it will be appreciated that the edge-following techniques described herein can be applied to a multitude of various automated processes across a wide variety of industries that distinctly different from the reverse-logistics industry.

It will be appreciated that while descriptions have been provided for the various models configured to perform the various tasks discussed herein (e.g., the anomaly detection model and the object localization vision model), the functions performed by the various models may be encompassed by one or more sets of computer-coded instructions without requiring clear delineation between the models, by combining the functions of multiple models into one, and/or by separating sub-functions of one or more models into discrete sub-models.

Conclusion

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, e.g., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

At least portions of the operations described herein can be implemented as operations performed by an information/data processing apparatus on information/data stored on one or more computer-readable storage devices or received from other sources.

The term "data processing apparatus" and similar terms encompass all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software program, software, software application, script, computer executable instructions, computer program code, code, and/or similar terminology) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A computer program can include electronically transmitted computer-executable instructions configured to cause a receiving device to perform one or more functions, including executing one or more pre-programmed functions of the recipient device and/or executing code received from the transmitting device. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output, which programmable processors may be incorporated into or otherwise in communication with the one or more apparatuses disclosed herein (e.g., the multi-axis robot, the ancillary tool(s), etc.). Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

The invention claimed is:

1. A computer-implemented method for following at least a portion of an edge of an object via an edge-following system, the computer-implemented method comprising an edge-following operation, wherein the edge-following operation comprises at least:

determining one or more dimensional attributes associated with the object;

causing a handling tool associated with a multi-axis robot to engage the object;

defining a working point on the edge of the object, wherein the working point is kept at a predetermined working offset from an ancillary tool associated with the edge-following system; and causing movement of the multi-axis robot to manipulate the object via the handling tool such that the working point is configured to move along the edge of the object from a first location on a first side of the edge of the object to a second location along a second side of the edge of the object while maintaining the predetermined working offset continuously between the ancillary tool and the working point, wherein the edge of the object comprises surfaces along a plurality of sides connected with corners, and wherein the plurality of sides include the first side and the second side, wherein causing movement of the multi-axis robot comprises rotating the object about a point of rotation that is computed based on a corner radius of the object so as to maintain the predetermined working offset while traversing a corner of the object.

2. The computer-implemented method of claim 1, wherein the ancillary tool is an image capturing device, the computer-implemented method further comprising:

capturing, via the image capturing device, image data associated with the edge of the object during execution of the edge-following operation; and generating, based on the image data, a continuous image of the edge of the object from the first location to the second location, including a first corner disposed between the first side and the second side.

3. The computer-implemented method of claim 2, the computer-implemented method further comprising:

inputting the continuous image into an anomaly detection model; and detecting, based on an output generated by the anomaly detection model, one or more physical defects associated with the edge of the object.

4. The computer-implemented method of claim 2, wherein the predetermined working offset is defined at least in part by a predetermined focal length of a lens of the image capturing device.

5. The computer-implemented method of claim 2, the edge-following operation further comprising:

determining a working orientation of the working point of the object relative to the image capturing device after causing the handling tool to engage the object, wherein the working orientation and working offset are configured to be controlled by the handling tool of the multi-axis robot such that the working point on the edge of the object remains in focus of the image capturing device during the edge-following operation.

6. The computer-implemented method of claim 1, wherein the one or more dimensional attributes associated with the object are determined via an object localization vision model, and wherein the one or more dimensional attributes comprise at least one of a length, a width, a depth, a corner location, a corner radius (e.g., radius of curvature), a center, an area, a position, an orientation, or any other external physical characteristics of the object.

7. The computer-implemented method of claim 1, wherein executing the edge-following operation further comprises:

determining, based at least in part on the one or more dimensional attributes, one or more points of rotation associated with the object, wherein the one or more points of rotation are associated with a corner radius of the object.

8. The computer-implemented method of claim 1, wherein causing the movement of the multi-axis robot to manipulate the object comprises executing a sequence of alternately translating the object linearly along one or more of an x-axis or a y-axis of a particular coordinate plane and rotating the object based in part on one or more points of rotation to capture image data associated with the plurality of sides and the corners comprised in the edge of the object.

9. The computer-implemented method of claim 1, wherein causing the handling tool associated with the multi-axis robot to engage the object further comprises engaging the object based in part on the one or more dimensional attributes associated with the object.

10. The computer-implemented method of claim 1, wherein the one or more dimensional attributes comprise exterior dimensions of the object as measured by an object localization vision model, and wherein the edge-following system is configured to perform the edge-following operation based solely on the exterior dimensions.

11. The computer-implemented method of claim 1, wherein maintaining the predetermined working offset comprises maintaining the working point at a fixed spatial location relative to a coordinate frame associated with the ancillary tool while the object is translated and rotated by the multi-axis robot.

12. The computer-implemented method of claim 1, wherein the predetermined working offset is maintained continuously as the working point traverses the first side, a corner, and the second side of the object without re-defining the working point or re-initializing the edge-following operation.

13. An edge-following system for following an edge of an object, the edge-following system comprising at least one processor and at least one non-transitory memory including computer-coded instructions thereon, the computer-coded instructions, when executed by the at least one processor, cause the edge-following system to:

determine one or more dimensional attributes associated with the object;

cause a handling tool associated with a multi-axis robot to engage the object;

define a working point on the edge of the object, wherein the working point is kept at a predetermined working offset from an ancillary tool associated with the edge-following system;

cause movement of the multi-axis robot to manipulate the object via the handling tool such that the working point is configured to move along the edge of the object from a first location on a first side of the edge of the object to a second location along a second side of the edge of the object while maintaining the predetermined working offset continuously between the ancillary tool and the working point, wherein the edge of the object comprises surfaces along a plurality of sides connected with corners, and wherein the plurality of sides include the first side and the second side; and cause movement of the multi-axis robot to rotate the object about a point of rotation that is computed based on a corner radius of the object so as to maintain the predetermined working offset while traversing a corner of the object.

14. The edge-following system of claim 13, wherein the computer-coded instructions, when executed by the at least one processor, further cause the edge-following system to:

capture, via an image capturing device, image data associated with the edge of the object; and generate, based on the image data, a continuous image of the edge of the object from the first location to the second location, including a first corner disposed between the first side and the second side.

15. The edge-following system of claim 14, wherein the computer-coded instructions, when executed by the at least one processor, further cause the edge-following system to:

input the continuous image into an anomaly detection model; and detect, based on an output generated by the anomaly detection model, one or more physical defects associated with the edge of the object.

16. The edge-following system of claim 14, wherein the computer-coded instructions, when executed by the at least one processor, further cause the edge-following system to:

determine a working orientation of the working point of the object relative to the image capturing device after causing the handling tool to engage the object, wherein the working orientation and working offset are configured to be controlled by the handling tool of the multi-axis robot such that the working point on the edge of the object remains in focus of the image capturing device.

17. The edge-following system of claim 13, wherein the one or more dimensional attributes associated with the object are determined via an object localization vision model, and wherein the one or more dimensional attributes comprise at least one of a length, a width, a depth, a corner location, a corner radius (e.g., radius of curvature), a center, an area, a position, an orientation, or any other external physical characteristics of the object.

18. The edge-following system of claim 13, wherein the computer-coded instructions, when executed by the at least one processor, further cause the edge-following system to:

determine, based at least in part on the one or more dimensional attributes, one or more points of rotation associated with the object, wherein the one or more points of rotation are associated with a corner radius of the object.

19. The edge-following system of claim 13, wherein the one or more dimensional attributes comprise exterior dimensions of the object as measured by an object localization vision model, and wherein the edge-following system is configured to use solely the exterior dimensions to define the working point.

20. At least one non-transitory computer-readable storage medium for following an edge of an object, the at least one non-transitory computer-readable storage medium having computer program code stored thereon that, in execution with at least one processor, configures the at least one processor to:

determine one or more dimensional attributes associated with the object;

cause a handling tool associated with a multi-axis robot to engage the object;

define a working point on the edge of the object, wherein the working point is kept at a predetermined working offset from an ancillary tool associated with an edge-following system;

cause movement of the multi-axis robot to manipulate the object via the handling tool such that the working point is configured to move along the edge of the object from a first location on a first side of the edge of the object to a second location along a second side of the edge of the object while maintaining the predetermined working offset continuously between the ancillary tool and the working point, wherein the edge of the object comprises surfaces along a plurality of sides connected with corners, and wherein the plurality of sides include the first side and the second side; and cause movement of the multi-axis robot to rotate the object about a point of rotation that is computed based on a corner radius of the object so as to maintain the predetermined working offset while traversing a corner of the object.

* * * * *